(12) United States Patent
Kishigami et al.

(10) Patent No.: US 7,728,902 B2
(45) Date of Patent: Jun. 1, 2010

(54) IMAGING DEVICE AND BIOMETRICS AUTHENTICATION APPARATUS

(75) Inventors: Masahiro Kishigami, Ibaraki (JP); Nobuhiro Umebayashi, Ibaraki (JP)

(73) Assignee: Hitachi Maxell, Ltd., Ibaraki-shi (JP)

( * ) Notice: Subject to any disclaimer, the term of this patent is extended or adjusted under 35 U.S.C. 154(b) by 431 days.

(21) Appl. No.: 11/882,528

(22) Filed: Aug. 2, 2007

(65) Prior Publication Data

US 2008/0031497 A1 Feb. 7, 2008

(30) Foreign Application Priority Data

Aug. 4, 2006 (JP) ............... 2006-213009
Jun. 22, 2007 (JP) ............... 2007-165586

(51) Int. Cl.
*H04N 5/225* (2006.01)

(52) U.S. Cl. ............... 348/340; 348/290; 348/291; 250/208.1; 257/294

(58) Field of Classification Search .............. 250/208.1; 257/291, 294; 348/77, 78, 79, 135, 290, 348/291, 335, 340, 342, 360, 363; 359/353, 359/354, 355, 356, 359, 362, 368, 739, 740; 382/115, 116, 117, 118, 124
See application file for complete search history.

(56) References Cited

U.S. PATENT DOCUMENTS 6,211,916 B1 * 4/2001 Hawkins et al. ............ 348/340

7,135,725 B2 * 11/2006 Kato ............................. 257/291
7,274,808 B2 * 9/2007 Baharav et al. .............. 382/124
7,515,342 B2 * 4/2009 Tanaka et al. ................ 359/619
2004/0252867 A1 * 12/2004 Lan et al. ..................... 382/124

FOREIGN PATENT DOCUMENTS

| JP | A 03-157602 | 7/1991 |
| JP | A 2005-071118 | 3/2005 |
| JP | A 2005-312749 | 11/2005 |

* cited by examiner

*Primary Examiner*—Lin Ye
*Assistant Examiner*—Don Nguyen
(74) *Attorney, Agent, or Firm*—Oliff & Berridge, PLC

(57) ABSTRACT

An imaging device includes a photoreceptor portion including a plurality of photoreceptors arranged in an array, a microlens array including a plurality of microlenses, and a light shielding layer placed between the photoreceptor portion and the microlens array. The light shielding layer has apertures located corresponding to the plurality of photoreceptors. An optical relationship of an actual length d1 of an aperture width of the apertures on a side of the photoreceptors, an actual length p of a distance between adjacent microlenses, an equivalent air length t0 of a distance between vein and a top of the microlenses, and an equivalent air length t1 of a thickness between the top of the microlenses and an aperture position of the apertures on the side of the photoreceptors satisfies:

$$\frac{1.36 \times t1}{p} \leq d1 \leq \frac{2.4 \times t1}{p} + \frac{p \times t1}{t0}.$$

23 Claims, 20 Drawing Sheets

IMAGING DEVICE AND BIOMETRICS AUTHENTICATION APPARATUS

BACKGROUND OF THE INVENTION

1. Field of the Invention

The present invention relates to an imaging device and a biometrics authentication apparatus.

2. Description of Related Art

Biometric authentication technology using human body characteristics such as fingerprints, irises and blood vessel patterns receives attention as a new security system. The biometric authentication technology offers convenience because there is no need to take along unlike a key or the like. Further, because there is also no possibility of loss unlike a key or the like, the risk of a threat to safety and security due to theft or the like is low.

Particularly, an authentication method using blood vessel patterns in a human finger or the like is not associated with criminal investigation unlike the method using fingerprints and does not require the application of light to eyeballs unlike the method using irises. Thus, the use of blood vessel patterns reduces the possibility that a person who undergoes the authentication process feels psychologically stressed. Further, because the authentication method using blood vessel patterns utilizes the information in vivo, the possibility of forgery is low.

The biometric authentication using a blood vessel pattern in a human finger is under development. Typically, a light source which applies a near-infrared ray to a finger and a camera which captures an image of a near-infrared ray passing through the finger are placed. An optical filter which transmits a near-infrared ray is attached to the camera. Upon biometric authentication, a finger is placed in the path of a near-infrared ray from the light source, and an image of the finger is captured by the camera. Although a near-infrared ray passes through a muscle, fat, bone and so on in vivo, it is absorbed by hemoglobin in the blood and a pigment component such as melanin.

Therefore, although an image which is captured by the camera is shown as white with transmitted light, a blood vessel portion is shown as black. The captured blood vessel pattern image is then checked against registered blood vessel patterns, thereby performing biometric authentication (cf. Japanese Unexamined Patent Application Publication Nos. 2005-312749 and 2005-71118).

There is a growing demand for a smaller and thinner biometric authentication apparatus for carrying out such biometric authentication. As an imaging device which is used in a biometric authentication apparatus, a monocular reduction optical system with the use of reduced imaging of a single or a plurality of lenses has been used. However, there is a limit to the size and thickness reduction for its lens structure.

Thus, there is an attempt to apply a compound-eye optical system which combines a microlens array with a plurality of photoreceptors to a biometric authentication apparatus. An imaging device with a compound-eye optical system is described in Japanese Unexamined Patent Application Publication No. 3-157602, for example.

Japanese Unexamined Patent Application Publication No. 3-157602 discloses an imaging device that includes a microlens array, a photoreceptor portion (image sensor) which is placed opposite to the microlens array, a light shielding layer (light shielding spacer) which is placed between the microlens array and the photoreceptor portion, and a plurality of apertures (translucent holes) having a light absorbing surface on at least part of its wall surface, which are placed between the microlens array and the photoreceptor portion.

FIG. 19 is a vertical sectional view of an imaging device disclosed in Japanese Unexamined Patent Application Publication No. 3-157602. According to the technique disclosed therein, a light shielding layer (light shielding spacer) 20A having a plurality of cylindrical apertures (translucent holes) 30A is placed between a microlens array (lens array plate) 50A and a photoreceptor portion (contact image sensor) 10A. The plurality of cylindrical apertures 30A are formed corresponding to the positions of microlenses (minute lenses) 51A and photoreceptors (photo-detectors) 11A.

A black coating which functions as a light absorbing surface is applied to the inside of each aperture 30A. With such a configuration, the technique disclosed in Japanese Unexamined Patent Application Publication No. 3-157602 can reduce the disadvantages of a compound-eye optical system. Specifically, it prevents the superposition of noise on a received signal at the photoreceptor 11A due to crosstalk, which is, entrance of light from a microlens 51A different from a corresponding microlens 51A into the photoreceptor 11A.

The technique disclosed in Japanese Unexamined Patent Application Publication No. 3-157602 allows suppression of crosstalk from an adjacent microlens 51A. However, the photoreceptor 11A receives light from the range of an area B. An area A is a desired imaging area above the microlens 51A which corresponds to the microlens 51A. The area B includes the area A and it is wider than the area A. Light from an area that excludes the area A from the area B becomes a noise component. Thus, if light from the area B enters the photoreceptor 11A, the quality of a signal which is generated in the photoreceptor 11A is degraded, causing an image on an obtained picture to appear blurred.

Further, if a gap between the microlens array 50A and the photoreceptors 11A is narrowed, the area B becomes wider. This results in further degradation of the quality of a signal from the photoreceptor 11A. This is a serious problem in reducing the thickness of an imaging device.

SUMMARY OF THE INVENTION

The present invention has been accomplished to address the above concern, and an object of the present invention is thus to provide an imaging device and a biometric authentication apparatus capable of suppressing the occurrence of noise effectively.

According to an aspect of the present invention, there is provided an imaging device which includes a photoreceptor portion including a plurality of photoreceptors arranged in an array, microlenses arranged corresponding to the plurality of photoreceptors, and a light shielding layer placed between the photoreceptor portion and the microlenses and having apertures located corresponding to the plurality of photoreceptors, wherein a relationship of an actual length d1 of an aperture width of the apertures on a side of the photoreceptors, an actual length p of a distance between adjacent microlenses, an equivalent air length t0 of a distance between an object and a top of the microlenses, and an equivalent air length t1 of a thickness between the top of the microlenses and an aperture position of the apertures on the side of the photoreceptors satisfies:

$$\frac{1.36 \times t1}{p} \le d1 \le \frac{2.4 \times t1}{p} + \frac{p \times t1}{t0};$$

In such a configuration, it is possible to prevent information coming from an area other than a desired imaging area from entering a photoreceptor, thereby effectively suppressing the occurrence of noise.

In the above imaging device, a relationship of the values d1, p, t0 and t1 preferably satisfies:

$$\frac{1.6 \times t1}{p} \le d1 \le \frac{1.9 \times t1}{p} + \frac{p \times t1}{t0}.$$

This enables more effective suppression of the occurrence of noise. Further, an aperture area of the apertures on the side of the photoreceptors is preferably equal to or smaller than an aperture area of the apertures on a side of the microlenses. Furthermore, it is preferred that at least a part of the light shielding layer at a boundary with the apertures is made of a light absorbing material, and at least a part of either one of a surface facing the photoreceptors or a surface facing the microlenses of the light shielding layer excluding the apertures is made of a light absorbing material or a light reflecting material. It is also preferred that a relationship of an actual length d2 of an aperture width of the apertures on a side of the microlenses, an equivalent air length t2 of a thickness between a top of the microlenses and an aperture position of the apertures on the side of the microlenses, and the values t0, t1, and p satisfies:

$$d2 \ge p\left(1 - \frac{t2}{t1} + \frac{t2}{t0}\right).$$

Further, in the above imaging device, a relationship of the values t1, t2, d1, d2 and p preferably satisfies:

$$t2 \le t1\left(1 - \frac{(d1 + d2)}{(2 \times p + d1)}\right).$$

It is also preferred that a relationship of an equivalent air length t3 of a thickness between the photoreceptors and an aperture position of the apertures on the side of the photoreceptors and the value t1 satisfies:

$$t3 < \frac{t1}{3}.$$

Further, a material being transparent to at least one wavelength in a wavelength range receivable by the photoreceptors may be filled inside the apertures. The imaging device may further include an optical filter blocking a visible light ray from entering the photoreceptors.

According to another aspect of the present invention, there is provided a biometric authentication apparatus which includes a light source outputting light to a biological portion, an imaging unit taking an image of the biological portion exposed to light from the light source, a storage unit storing a plurality of pieces of biometric information, a collating unit collating biometric information obtained from the biological portion imaged by the imaging unit with biometric information stored in the storage unit, and a control unit performing biometric authentication based on a collation result of the collating unit. The imaging unit includes a photoreceptor portion including a plurality of photoreceptors arranged in an array, microlenses arranged corresponding to the plurality of photoreceptors, and a light shielding layer placed between the photoreceptor portion and the microlenses and having apertures located corresponding to the plurality of photoreceptors, wherein a relationship of an actual length d1 of an aperture width of the apertures on a side of the photoreceptors, an actual length p of a distance between adjacent microlenses, an equivalent air length t0 of a distance between the biological portion and a top of the microlenses, and an equivalent air length t1 of a thickness between the top of the microlenses and an aperture position of the apertures on the side of the photoreceptors satisfies:

$$\frac{1.36 \times t1}{p} \le d1 \le \frac{2.4 \times t1}{p} + \frac{p \times t1}{t0}.$$

In such a configuration, it is possible to prevent information coming from an area other than a desired imaging area from entering a photoreceptor, thereby effectively suppressing the occurrence of noise.

In the above biometric authentication apparatus, a relationship of the values d1, p, t0 and t1 preferably satisfies:

$$\frac{1.6 \times t1}{p} \le d1 \le \frac{1.9 \times t1}{p} + \frac{p \times t1}{t0}.$$

This enables more effective suppression of the occurrence of noise. Further, an aperture area of the apertures on the side of the photoreceptors is preferably equal to or smaller than an aperture area of the apertures on a side of the microlenses. Furthermore, it is preferred that at least a part of the light shielding layer at a boundary with the apertures is made of a light absorbing material, and at least apart of either one of a surface facing the photoreceptors or a surface facing the microlenses of the light shielding layer excluding the apertures is made of a light absorbing material or a light reflecting material. It is also preferred that a relationship of an actual length d2 of an aperture width of the apertures on a side of the microlenses, an equivalent air length t2 of a thickness between a top of the microlenses and an aperture position of the apertures on the side of the microlenses, and the values t0, t1, and p satisfies:

$$d2 \ge p\left(1 - \frac{t2}{t1} + \frac{t2}{t0}\right).$$

Further, in the above biometric authentication apparatus, a relationship of the values t1, t2, d1, d2 and p preferably satisfies:

$$t2 \le t1\left(1 - \frac{(d1 + d2)}{(2 \times p + d1)}\right).$$

It is also preferred that a relationship of an equivalent air length t3 of a thickness between the photoreceptors and an aperture position of the apertures on the side of the photoreceptors and the value t1 satisfies: t3<t1/3. Further, a material being transparent to at least one wavelength in a wavelength range from 680 nm to 1200 nm may be filled inside the apertures. The biometric authentication apparatus may further include an optical filter blocking a visible light ray from entering the photoreceptors.

According to yet another aspect of the present invention, there is provided an imaging device which includes a photoreceptor portion including a plurality of photoreceptors arranged in an array, microlenses arranged corresponding to the plurality of photoreceptors, and a light shielding layer placed between the photoreceptor portion and the microlenses and having apertures located corresponding to the plurality of photoreceptors, wherein a relationship of an actual length d1 of a minimum aperture width of the apertures on a side of the photoreceptors, an actual length p of a minimum distance between adjacent microlenses, an actual length width wmin of a minimum width of an aperture shape of the microlenses, an equivalent air length t0 of a distance between an object and a top of the microlenses, and an equivalent air length t1 of a thickness between the top of the microlenses and an aperture position of the apertures on the side of the photoreceptors satisfies:

$$\frac{1.2 \times t1}{w\,\mathrm{min}} \le d1 \le \frac{2.4 \times t1}{w\,\mathrm{min}} + \frac{p \times t1}{t0}.$$

In the above imaging device, a relationship of the values d1, p, wmin, t0 and t1 preferably satisfies:

$$\frac{1.5 \times t1}{w\,\mathrm{min}} \le d1 \le \frac{1.9 \times t1}{w\,\mathrm{min}} + \frac{p \times t1}{t0}.$$

Further, an aperture area of the apertures on a side of the photoreceptors is preferably equal to or smaller than an aperture area of the apertures on a side of the microlenses.

It is preferred that at least a part of the light shielding layer at a boundary with the apertures is made of a light absorbing material, and at least a part of either one of a surface facing the photoreceptors or a surface facing the microlenses of the light shielding layer excluding the apertures is made of a light absorbing material or a light reflecting material.

Furthermore, in the above imaging device, a relationship of an actual length d2 of a minimum aperture width of the apertures on a side of the microlenses, an equivalent air length t2 of a thickness between a top of the microlenses and an aperture position of the apertures on the side of the microlenses, and the values t1, wmin and d1 preferably satisfies:

$$w\,\mathrm{min} - \frac{d1}{2} - \frac{t2}{t1}\left(\frac{d1}{2} + w\,\mathrm{min}\right) \le d2 \le 1.5 \times w\,\mathrm{min}\left(1 - \frac{t2}{t1}\right).$$

It is also preferred that a relationship of the values t1, t2, d2 and wmin satisfies:

$$\frac{2}{3} \times w\,\mathrm{min}\left(1 - \frac{t2}{t1}\right) \le d2 \le 1.5 \times w\,\mathrm{min}\left(1 - \frac{t2}{t1}\right).$$

It is further preferred that a relationship of an equivalent air length t3 of a thickness between the photoreceptors and an aperture position of the apertures on the side of the photoreceptors, and the values t1, t2, d1 and d2, a minimum width cw of the photoreceptors, and the value p satisfies:

$$t3 < \frac{(t1-t2)(2 \times p - d2 - cw)}{(d1+d2)}.$$

In the above imaging device, a material being transparent to at least one wavelength in a wavelength range receivable by the photoreceptors is preferably filled inside the apertures.

Further, a plane shape of the apertures on the side of the photoreceptors and a plane shape of the apertures on a side of the microlenses are preferably similar or substantially similar to an aperture shape of the microlenses.

The imaging device preferably includes an optical filter blocking a visible light ray from entering the photoreceptors.

According to still another aspect of the present invention, there is provided a biometric authentication apparatus including a light source outputting light to a biological portion, an imaging unit taking an image of the biological portion exposed to light from the light source, a storage unit storing a plurality of pieces of biometric information, a collating unit collating biometric information obtained from the biological portion imaged by the imaging unit with biometric information stored in the storage unit, and a control unit performing biometric authentication based on a collation result of the collating unit. The imaging unit includes a photoreceptor portion including a plurality of photoreceptors arranged in an array, microlenses arranged corresponding to the plurality of photoreceptors, and a light shielding layer placed between the photoreceptor portion and the microlenses and having apertures located corresponding to the plurality of photoreceptors, wherein a relationship of an actual length d1 of a minimum aperture width of the apertures on a side of the photoreceptors, an actual length p of a minimum distance between adjacent microlenses, an actual length wmin of a minimum width of an aperture shape of the microlenses, an equivalent air length t0 of a distance between the biological portion and a top of the microlenses, and an equivalent air length t1 of a thickness between the top of the microlenses and an aperture position of the apertures on the side of the photoreceptors satisfies:

$$\frac{1.2 \times t1}{w\,\mathrm{min}} \le d1 \le \frac{2.4 \times t1}{w\,\mathrm{min}} + \frac{p \times t1}{t0}.$$

In the above biometric authentication apparatus, a relationship of the values d1, p, wmin, t0 and t1 preferably satisfies:

$$\frac{1.5 \times t1}{w\,\mathrm{min}} \le d1 \le \frac{1.9 \times t1}{w\,\mathrm{min}} + \frac{p \times t1}{t0}.$$

Further, an aperture area of the apertures on a side of the photoreceptors is preferably equal to or smaller than an aperture area of the apertures on a side of the microlenses.

It is preferred that at least a part of the light shielding layer at a boundary with the apertures is made of a light absorbing material, and at least a part of either one of a surface facing the photoreceptors or a surface facing the microlenses of the light shielding layer excluding the apertures is made of a light absorbing material or a light reflecting material.

Furthermore, in the above biometric authentication apparatus, a relationship of an actual length d2 of a minimum aperture width of the apertures on a side of the microlenses, an equivalent air length t2 of a thickness between a top of the microlenses and an aperture position of the apertures on the side of the microlenses, and the values t1, wmin and d1 preferably satisfies:

$$w\min - \frac{d1}{2} - \frac{t2}{t1}\left(\frac{d1}{2} + w\min\right) \le d2 \le 1.5 \times w\min\left(1 - \frac{t2}{t1}\right).$$

It is also preferred that a relationship of the values t1, t2, d2 and wmin satisfies:

$$\frac{2}{3} \times w\min\left(1 - \frac{t2}{t1}\right) \le d2 \le 1.5 \times w\min\left(1 - \frac{t2}{t1}\right).$$

It is further preferred that a relationship of an equivalent air length t3 of a thickness between the photoreceptors and an aperture position of the apertures on the side of the photoreceptors, and the values t1, t2, d1 and d2, a minimum width cw of the photoreceptors, and the value p satisfies:

$$t3 < \frac{(t1 - t2)(2 \times p - d2 - cw)}{(d1 + d2)}.$$

In the above biometric authentication apparatus, a material being transparent to at least one wavelength in a wavelength range from 600 nm to 1200 nm is preferably filled inside the apertures. Further, a plane shape of the apertures on the side of the photoreceptors and a plane shape of the apertures on a side of the microlenses are preferably similar or substantially similar to an aperture shape of the microlenses. The biometric authentication apparatus preferably includes an optical filter blocking a visible light ray from entering the photoreceptors.

The above and other objects, features and advantages of the present invention will become more fully understood from the detailed description given hereinbelow and the accompanying drawings which are given by way of illustration only, and thus are not to be considered as limiting the present invention.

DESCRIPTION OF THE PREFERRED EMBODIMENTS

First Embodiment

Figure 1:
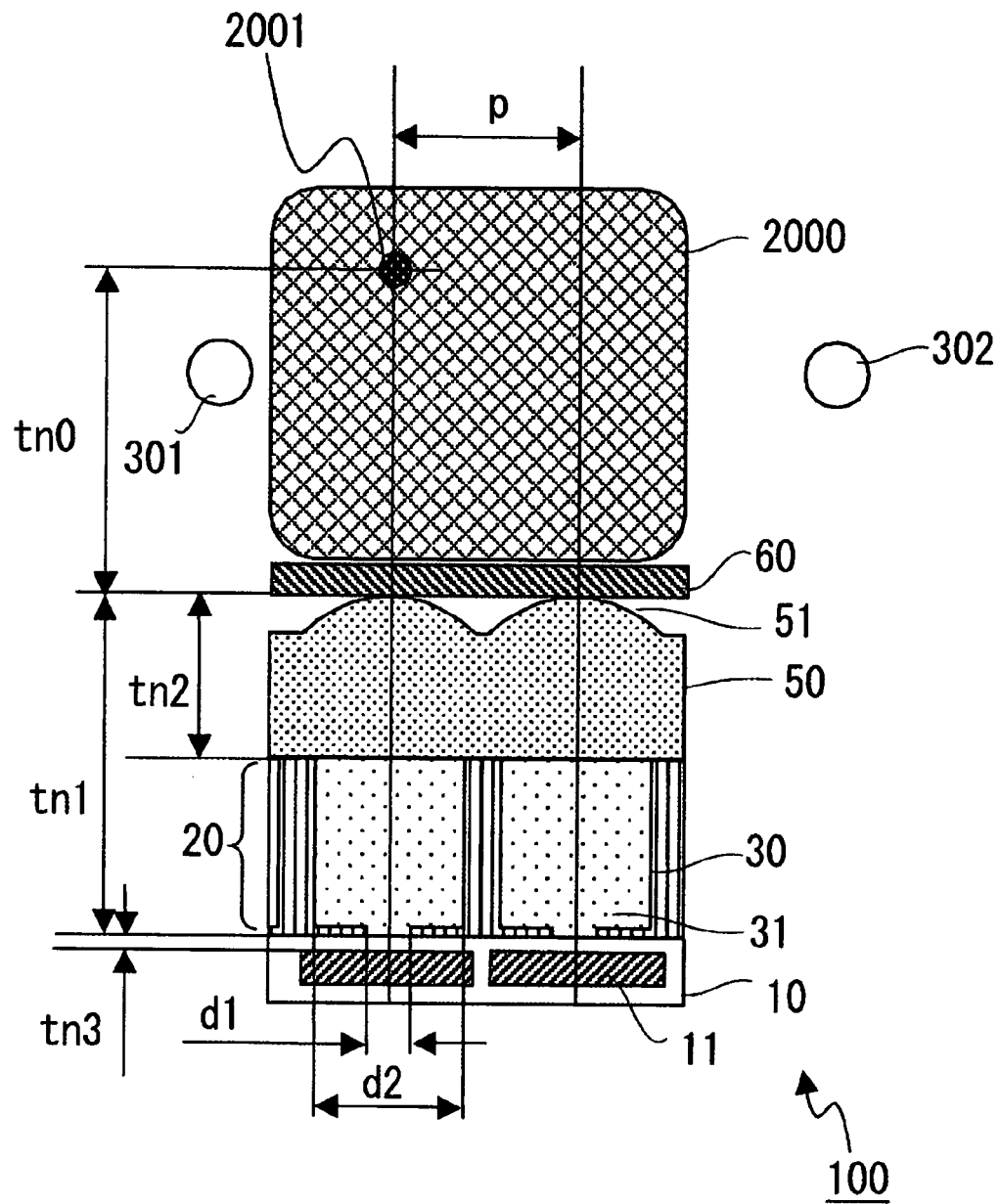
FIG. 1 is a sectional view schematically showing the structure of an imaging unit of a biometric authentication apparatus according to a first embodiment of the present invention.
Figure 2:
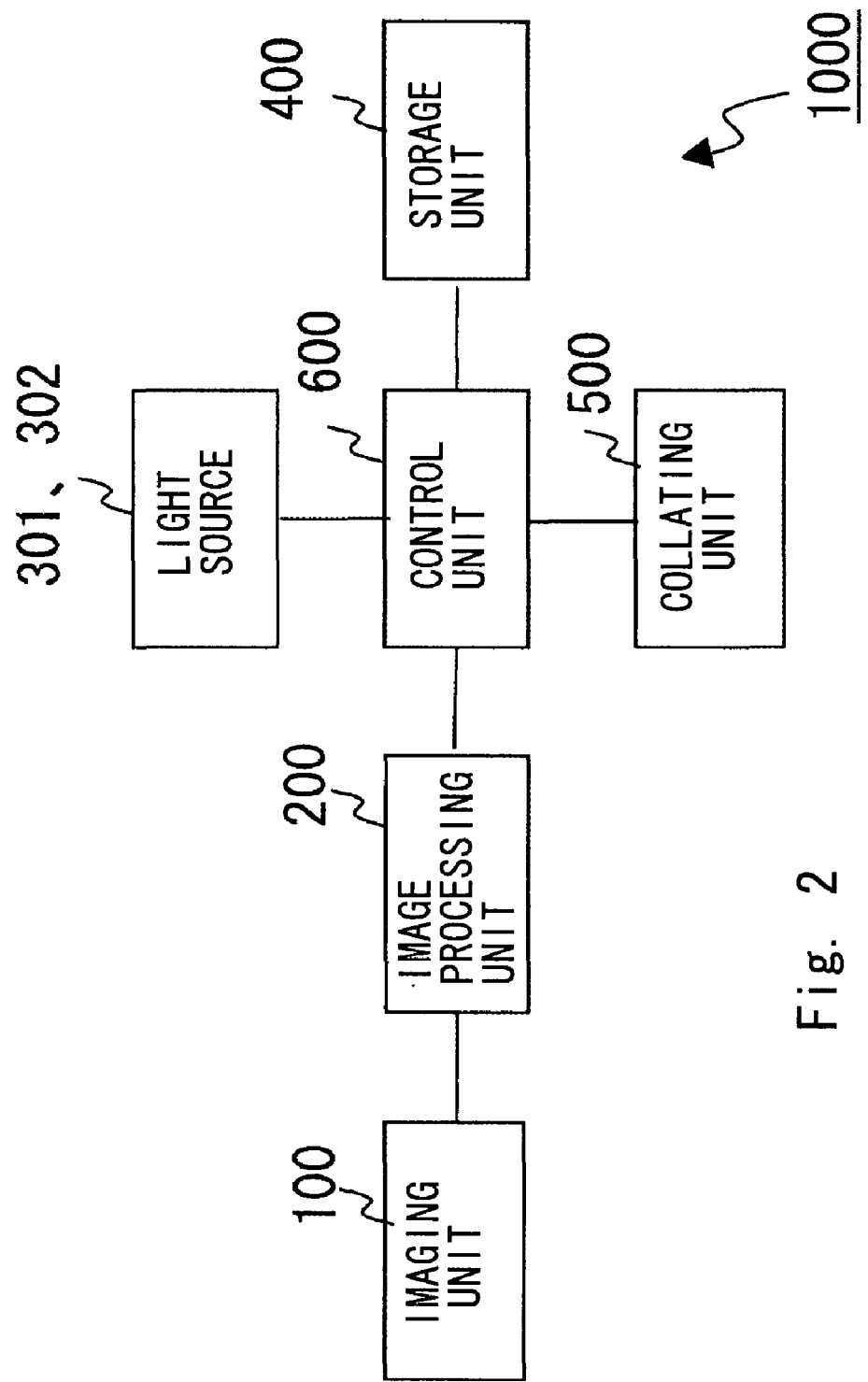
FIG. 2 is a block diagram showing the configuration of a biometric authentication apparatus according to an embodiment of the present invention.

The structure of a biometric authentication apparatus according to a first embodiment of the present invention is described hereinafter. FIG. 1 is a sectional view schematically showing the structure of an imaging device of the biometric authentication apparatus according to this embodiment. FIG. 2 is a block diagram showing the configuration of the biometric authentication apparatus according to an embodiment of the present invention. The dimensions shown in FIG. 1 indicate actual lengths.

Referring first to FIG. 2, a biometric authentication apparatus 1000 according to the first embodiment of the invention includes an imaging unit 100, an image processing unit 200, light sources 301 and 302, a storage unit 400, a collating unit 500, and a control unit 600.

The imaging unit 100 is connected with an image processing unit 200. The imaging unit 100 captures an image of a pattern of vein 2001 of a finger 2000 (biometric information). Near-infrared rays from the light sources 301 and 302 are applied to the finger 2000 (biological portion) which is placed above the imaging unit 100. The structure of the imaging unit 100 is described in detail later.

The image processing unit 200 is connected with the imaging unit 100 and the control unit 600. The image processing unit 200 image-processes a signal (the pattern of the vein 2001) which is output from the imaging unit 100.

The light sources 301 and 302 are connected with the control unit 600. The light sources 301 and 302 are composed of a plurality of near-infrared ray emitting elements. The light sources 301 and 302 emit near-infrared rays (wavelength: 680 nm to 1200 nm, preferably 800 nm to 950 nm) to the side surface of the finger 2000.

The storage unit 400 is connected with the control unit 600. The storage unit 400 stores a plurality of vein patterns which are captured by the imaging unit 100 in advance.

The collating unit 500 is connected with the control unit 600. The collating unit 500 is controlled by the control unit 600. The collating unit 500 checks the pattern of the vein 2001 which is captured by the imaging unit 100 against the vein patterns which are pre-stored in the storage unit 400.

The control unit 600 is connected with the image processing unit 200, the light sources 301 and 302, the storage unit 400 and the collating unit 500. The control unit 600 controls the image processing unit 200, the light sources 301 and 302, the storage unit 400 and the collating unit 500. The control unit 600 makes a decision on biometric authentication based on the collation result in the collating unit 500.

A method of biometric authentication in the biometric authentication apparatus 1000 is described hereinafter.

First, a finger 2000 is placed above the imaging unit 100. Then, near-infrared rays are applied to the finger 2000 from the light sources 301 and 302. The near-infrared rays pass through the inside of the finger 2000. After passing through the finger 2000, the near-infrared rays enter each photoreceptor 11 through an optical filter 60, a microlens array 50 and a light shielding layer 20. Each photoreceptor 11 receives the incoming near-infrared ray. A photoreceptor portion 10 outputs a signal which is generated in each photoreceptor 11.

The image processing unit 200 image-processes an output signal from the imaging unit 100. Specifically, the image processing unit 200 removes unclear part of a captured vein 2001 pattern. Then, the collating unit 500 checks the pattern of the vein 2001 in the finger 2000 which is captured by the imaging unit 100 against vein patterns which are pre-stored in the storage unit 400. The control unit 600 performs biometric authentication based on the collation result in the collating unit 500.

If the collating unit 500 determines that the pattern of the vein 2001 matches with a vein pattern which is pre-stored in the storage unit 400, the control unit 600 generates an authentication success signal. In response to the authentication success signal, a display unit (authorization result output unit), which is not shown, displays an authorization result. On the other hand, if the collating unit 500 determines that the pattern of the vein 2001 does not match with any vein patterns which are pre-stored in the storage unit 400, the control unit 600 generates an authentication failure signal. In response to the authentication failure signal, a display unit (authorization result output unit), which is not shown, displays an authorization result.

The structure around the imaging unit 100 is descried hereinbelow. Referring to FIG. 1, the light sources 301 and 302 are placed on both sides of the finger 2000. The light sources 301 and 302 are composed of a plurality of near-infrared ray emitting elements arranged in an array. The plurality of near-infrared ray emitting elements are arranged along the finger 2000. The finger is placed above the imaging unit 100.

When taking a vein pattern in the finger 2000 by the imaging unit 100, the finger 2000 is placed above the imaging unit 100, and near-infrared rays are applied to the side surfaces of the finger 2000 from the light sources 301 and 302.

The positions of the light sources 301 and 302 are arbitrary. The light sources 301 and 302 may be located at the upper side of the finger 2000. The number of light sources is also arbitrary. The number of light sources may be one or three and more.

The imaging unit 100 includes the photoreceptor portion 10, the light shielding layer 20, an aperture 30, the microlens array 50, and the optical filter 60.

In the photoreceptor portion 10, a plurality of photoreceptors 11 are arranged two-dimensionally at regular intervals. The photoreceptor portion 10 may be composed of CCD (Charge Coupled Device) sensors, CMOS (Complementary Metal Oxide Semiconductor) sensors and so on. Each photoreceptor 11 is an element that includes one or a plurality of pixels.

The light shielding layer 20 is placed between the photoreceptor portion 10 and the microlens array 50. The light shielding layer 20 is formed on the lower surface of the microlens array 50. A light absorbing material (e.g. pigment or photosensitive resin) may be used for the light shielding layer 20.

The light shielding layer 20 has a plurality of apertures 30. Each aperture 30 has a light incident surface and a light exit surface. The light incident surface of the aperture 30 is on the side of the microlens array 50, and it practically corresponds to the lower surface of the microlens array 50 in this embodiment. The light exit surface of the aperture 30 is on the side of the photoreceptor portion 10, and it practically corresponds to the upper surface of the photoreceptor portion 10. Each aperture 30 is placed corresponding to each photoreceptor 11. The aperture 30 is formed in the propagation path of light which comes from the microlens 51 to enter the photoreceptor 11. A light shielding layer is placed between adjacent apertures 30. The aperture width of the aperture 30 is adjusted in such a way that light having a noise component (i.e. light incoming from an area other than a desired area, light from a gap between adjacent microlenses 51, and crosstalk light (light from another microlens 51)) is absorbed by the light shielding layer between adjacent apertures 30.

The aperture 30 is an opening which is called "aperture" in the optical term. A translucent portion 31 is formed in the aperture 30. The translucent portion 31 is formed by filling a transparent resin to a near-infrared ray inside the aperture 30. The upper surface of the translucent portion 31 corresponds to the light incident surface of the aperture 30. The lower surface of the translucent portion 31 corresponds to the light exit surface of the aperture 30. A material to be filled in each aperture 30 is preferably a material that is transparent to at least one wavelength in the range of 680 nm to 1200 nm, which is, a transparent glass or a transparent resin such as epoxy or acrylic, for example. The aperture 30 may be hollow. Further, the translucent portion 31 corresponding to the aperture 30 may be formed by creating a plurality of grooves in a laminated resin layer by normal semiconductor process technology.

As shown in FIG. 1, the aperture 30 has two different aperture widths. Specifically, the aperture 30 has a first aperture width on the side of the photoreceptor 11 and a second aperture width on the side of the microlens 51. The first aperture width is narrower than the second aperture width. A specific aperture width or the like of the aperture 30 is described in detail later.

The microlens array 50 includes a plurality of microlenses 51. Each microlens 51 has a convex shape. The microlens array 50 may be configured by forming a plurality of microlenses 51 on a transparent substrate, for example. The plurality of microlenses 51 are arranged corresponding to the plurality of photoreceptors 11. The interval of the microlenses 51 is substantially the same as the interval of the photoreceptors 11.

A focal length of the microlens 51 is set in such a way that light from the vein 2001 in the finger 2000 as an object is focused on the surface of the photoreceptor 11. A transparent resin or a transparent glass is used as a material of the microlens array 50. The microlens 51 may be a refractive lens or a diffractive lens.

The optical filter 60 is placed on the microlens array 50. The optical filter 60 is a band-pass filter which transmits light in a near-infrared region (particularly, light with at least one wavelength in the range from 680 nm to 1200 nm). The optical filter 60 is a filter of a light absorbing type or a reflecting type by light interference.

As shown in FIG. 1, an actual length of the aperture width of the aperture 30 on the side of the photoreceptor 11 (a first aperture width of the aperture 30) is d1, an actual length of the distance between adjacent microlenses 51 is p, an actual length of the distance between the vein 2001 in the finger 2000 as an object and the top of the microlens 51 is tn0, and an actual length of the thickness between the top of the microlens 51 and the aperture position of the aperture 30 on the side of the photoreceptor 11 is tn1. The aperture position of the aperture 30 on the side of the photoreceptor 11 corresponds to the light exit surface of the aperture 30 in this embodiment.

An equivalent air length t0 of the distance between the vein 2001 in the finger 2000 as an object and the top of the microlens 51 is defined as a sum of each thickness of one or a plurality of kinds of materials existing between the vein 2001 and the top of the microlens 51 being divided by each respective refractive index.

In the structure of FIG. 1, t0=(a depth from the surface of the finger 2000 on the side of the photoreceptor 11 to the vein 2001)/(a refractive index of the finger 2000)+(a thickness of the optical filter 60)/(a refractive index of the optical filter 60). tn0=(a depth from the surface of the finger 2000 on the side of the photoreceptor 11 to the vein 2001)+(a thickness of the optical filter 60). Likewise, an equivalent air length of the thickness between the top of the microlens 51 and the aperture position of the aperture 30 on the side of the photoreceptor 11 is t1.

In such conditions, the relationship of d1, p, t0 and t1 is set to satisfy the following expression:

$$\frac{1.36 \times t1}{p} \le d1 \le \frac{2.4 \times t1}{p} + \frac{p \times t1}{t0} \qquad \text{Expression (1)}$$

If the above expression (1) is satisfied, it is possible to prevent the light having information from an area outside of a desired imaging area from entering the photoreceptor 11. It is thereby possible to effectively avoid the superposition of noise on an obtained image.

When the light from an object is focused by the microlens 51 onto the surface of the aperture 30 on the side of the photoreceptor 11, an optical spot size S is wave-optically estimated approximately $$S = 2 \times \lambda \times \frac{t1}{D}.$$

$\lambda$ is a wavelength of light, and D is a diameter of a lens. If $\lambda$ is 680 nm and D≈p, $$S = \frac{1.36 \times t1}{p}.$$

$\lambda$=680 nm is the shortest wavelength among those used in the vein authentication of this embodiment. If d1 is smaller than $$\frac{1.36 \times t1}{p},$$

the received light intensity decreases, resulting in a dark image. Thus, d1 is preferably $$\frac{1.36 \times t1}{p}$$

or larger.

Likewise, if $\lambda$ is 1200 nm, an optical spot size S is estimated approximately $$\frac{2.4 \times t1}{p}.$$

$\lambda$=1200 nm is the longest wavelength among those used in the vein authentication of this embodiment. Further, among light rays from an object, the light from the position at a distance of p/2 from the optical axis of the microlens 51 reaches the position at a distance of $$\left(\frac{p}{2}\right) \times \left(\frac{t1}{t0}\right)$$

from the optical axis of the microlens 51 on the surface of the aperture 30 on the side of the photoreceptor 11. The light which is incident on the photoreceptor 11 from the position at a distance of p/2 or farther from the optical axis of the microlens 51 is light from an area outside of a desired imaging area, which becomes a noise component.

As described above, if d1 exceeds $$\frac{2.4 \times t1}{p} + \frac{p \times t1}{t0},$$

light having a noise component enters a photoreceptor. Accordingly, it is preferred to set d1 to be $$\frac{2.4 \times t1}{p} + \frac{p \times t1}{t0}$$

or less in order to obtain a high-quality image.

An optimum wavelength rage for vein authentication is 800 nm to 950 nm. An optical spot size at a wavelength of 800 nm is $$\frac{1.6 \times t1}{p},$$

and an optical spot size at a wavelength of 950 nm is $$\frac{1.9 \times t1}{p}.$$

Accordingly, noise can be removed more effectively if the relationship of d1, p, t0 and t1 is set to satisfy the following expression:

$$\frac{1.6 \times t1}{p} \le d1 \le \frac{1.9 \times t1}{p} + \frac{p \times t1}{t0} \qquad \text{Expression (2)}$$

Further, if an actual length of the aperture width of the aperture 30 on the side of the microlens 51 (a second aperture width of the aperture 30) is d2 as shown in FIG. 1, light having a signal component can be effectively incident on the photoreceptor 11 when d2 is d1 or larger.

Further, if an equivalent air length of the thickness between the top of the microlens 51 and the aperture position of the aperture 30 on the side of the microlens 51 is t2 as shown in FIG. 1, among light rays from an object, the light from the position at a distance of p/2 from the optical axis of the microlens 51 passes through the position at a distance of $$\frac{p}{2} \times \left(1 - \frac{t2}{t1} + \frac{t2}{t0}\right)$$

at maximum away from the optical axis of the microlens 51 on the surface of the aperture 30 on the side of the microlens 51. Thus, the relationship of d2, t0, t1 and p is preferably set to satisfy the following expression:

$$d2 \ge p\left(1 - \frac{t2}{t1} + \frac{t2}{t0}\right) \qquad \text{Expression (3)}$$

If the expression (3) is satisfied, it is possible prevent light having a signal component (light having necessary information which comes from an intended area) from being blocked by the light shielding layer 20. The light having a signal component can thereby effectively enter the photoreceptor 11.

Further, it is preferred that the relationship of t1, t2, d1, d2 and p satisfies the following expression:

$$t2 \le t1\left(1 - \frac{(d1 + d2)}{(2 \times p + d1)}\right) \qquad \text{Expression (4)}$$

If the expression (4) is satisfied, it is possible to prevent the light coming from another microlens 51 from entering the photoreceptor. This suppresses the occurrence of crosstalk, thereby effectively avoiding the superposition of noise on an output signal from the photoreceptor 11.

Further, if an equivalent air length of the thickness between the photoreceptor 11 and the aperture position of the aperture 30 on the side of the photoreceptor 11 is t3 as shown in FIG. 1, it is preferred that the relationship of t1 and t3 satisfies the following expression:

$$t3 < \frac{t1}{3} \qquad \text{Expression (5)}$$

Incidentally, t3 is also defined as an equivalent air length of the thickness between the light-receiving surface of the photoreceptor 11 and the lower surface of the translucent portion 31.

If the expression (5) is satisfied, it is possible to prevent the light coming from another microlens 51 from entering the photoreceptor after passing through the adjacent aperture 30. This suppresses the occurrence of crosstalk, thereby effectively avoiding the superposition of noise on an obtained signal.

A method of manufacturing an imaging unit according to the first embodiment of the present invention is described hereinafter. The photoreceptor portion 10, the light shielding layer 20, the microlens array 50 and so on are produced and then placed on top of one another as illustrated in FIG. 1, thereby completing the imaging unit 100.

Referring now to FIGS. 3A to 3E, a method of manufacturing the microlens array 50 is described hereinafter.

Figure 3A:
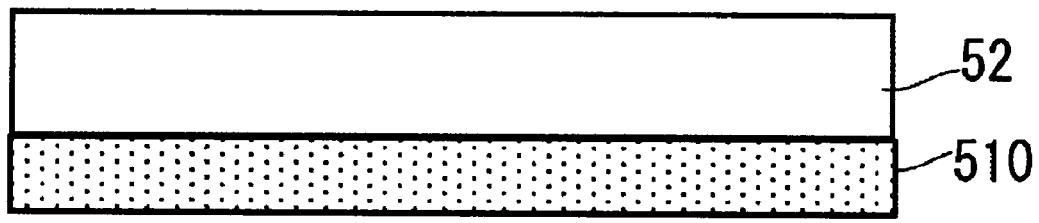
FIGS. 3A to 3E are views showing a manufacturing method of a microlens array.

Referring first to FIG. 3A, a transparent substrate 52, which is made of glass, is prepared. Then, a photosensitive resin (transparent negative resist) is applied all over the transparent substrate 52 by a general coating process (spin coating, slit coating or the like). A lens formation layer 510 is thereby formed. The transparent substrate 52 is a quartz glass substrate with a size of 5 inches and a thickness of 300 µm and having a refractive index of 1.45.

Figure 3B:
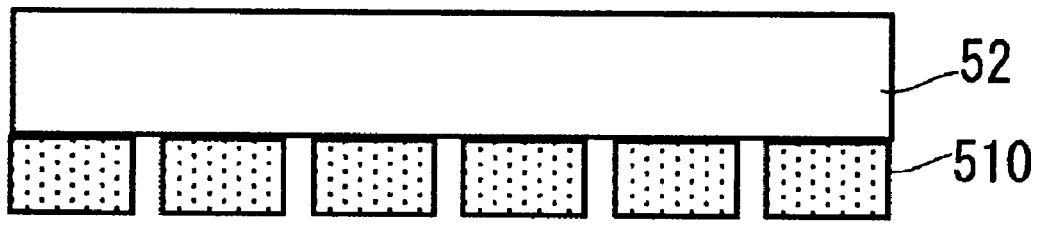

Referring next to FIG. 3B, the lens formation layer 510 is patterned using a mask. A plurality of cylindrical shapes are thereby formed with a certain distance away from each other. The mask has a pattern corresponding to the shape of the microlens 51.

Figure 3C:
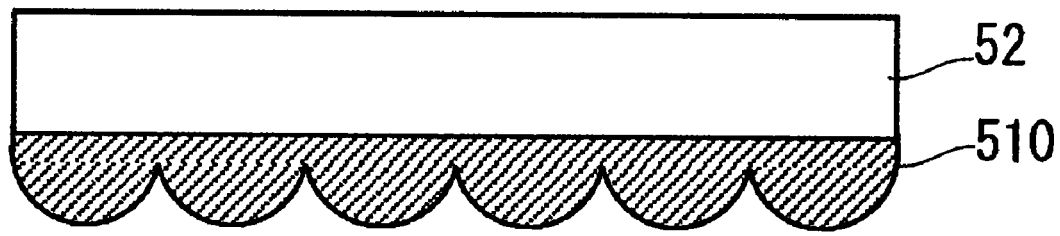

Referring then to FIG. 3C, heat treatment is performed over the lens formation layer 510. The lens formation layer 510 is thereby hardened into the shape of the microlenses.

Figure 3D:
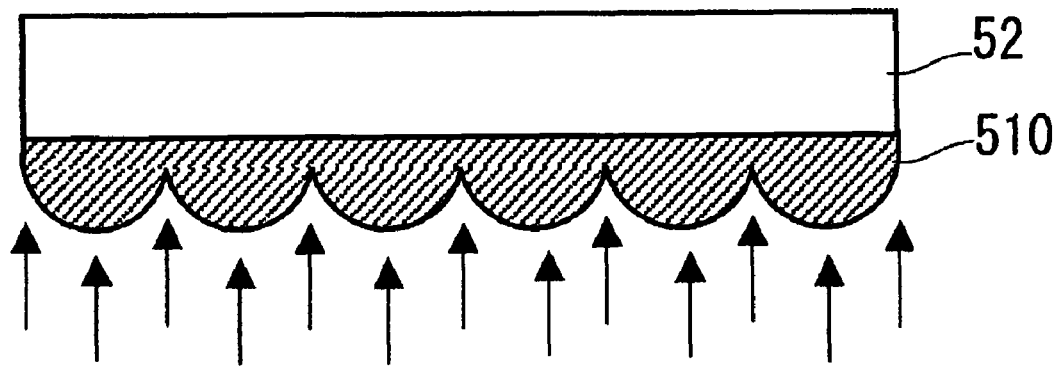

Referring further to FIG. 3D, the shape of the microlenses is transferred onto the transparent substrate 52 by etching.

Figure 3E:
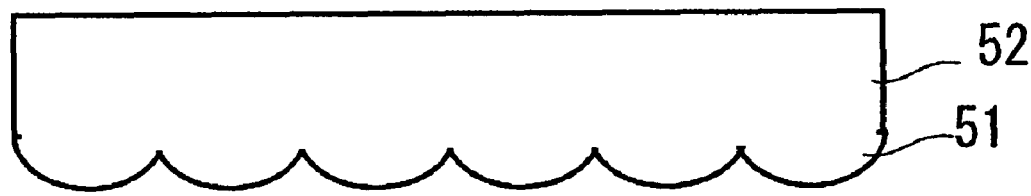

Referring finally to FIG. 3E, the microlenses 51 are formed on the transparent substrate 52.

The microlens array 50 is thereby completed in the above process. A distance between the tops of the adjacent microlenses 51 is 100 µm, and a diameter of each microlens is 97 µm. A focal length of each microlens 51 is set in such a way that the light from the vein 2001 in the finger 2000 is focused at the center of the aperture 30 on the side of the photoreceptor 11. Specifically, a focal length of each microlens 51 is set by adjusting the thickness of the lens formation layer 510 and an etching rate ratio.

A method of forming the light shielding layer 20 is described hereinbelow.

A transparent photosensitive resin (transparent resist) is applied all over one surface of the microlens array 50 (an opposite surface from the surface with the microlenses 51). Then, exposure and development are performed using a mask. After that, a cylindrical translucent portion 31 is formed at the position corresponding to each microlens 51.

The thickness of the transparent photosensitive resin is 345 μm, and the diameter of the cylindrical shape is 75 μm. The translucent portion 31 is transparent to a near-infrared ray, and it has a refractive index of 1.60.

After that, a black photosensitive resin as a light absorbing material is injected between the translucent portions 31 and then hardened. The black photosensitive resin is formed to completely cover the translucent portion 31. The thickness of the applied black photosensitive resin is 350 μm.

Further, an aperture is created in the black photosensitive resin layer which is formed on the translucent portion 31 using a normal semiconductor process technology (etching or the like) A diameter of the aperture is 12 μm.

The light shielding layer 20 is thereby formed on the microlens array 50 in the above process. A distance between the adjacent apertures 30 is 100 μm, an aperture width of the aperture 30 on the side of the microlens 51 is 75 μm, an aperture width of the aperture 30 on the side of the photoreceptor 11 is 12 μm, and a thickness of the aperture 30 is 350 μm (a total of the transparent resin of 345 μm and the air of 5 μm).

The light shielding layer 20 may be formed on the photoreceptor portion 10. Alternatively, a light shielding layer may be formed on a light shielding layer holding substrate, which is separately prepared.

The photoreceptor portion 10 is a sensor using a double-gate thin-film transistor. A distance between the adjacent photoreceptors 11 is 100 μm, and a size of the photoreceptor portion 10 is 15 mm×20 mm. A protective insulating layer (a silicon oxide film) having a refractive index of 1.50 is formed on an electrode of the double-gate thin-film transistor. Further, a transparent resin layer having a refractive index of 1.50 is formed at a thickness of 50 μm on the protective insulating layer.

The photoreceptor portion 10, the light shielding layer 20, the microlens array 50 are adhered to each other using alignment marks, for example, as shown in FIG. 1. Further, the optical filter 60 is formed on the microlens array 50. A thickness of the optical filter 60 is 500 μm. A refractive index of the optical filter 60 is 1.5. The imaging unit 100 is produced in this manner.

The image of the vein 2001 in the finger 2000 is taken with the use of the imaging unit 100, which is produced in the above-described process.

Referring again to FIG. 1, an image of the position at a depth of 2.5 mm from the skin of the finger 2000 which is placed above the optical filter 60 is picked up using the imaging unit 100. Generally, the vein of the finger exists in the position at a depth of 2.5 mm from the finger skin. A refractive index of the finger for a near-infrared ray is 1.34.

An equivalent air length t0 of the distance between the vein 2001 in the finger 2000 and the top of the microlens 51 is calculated as the following expression:

$$t0=2500/1.34+500/1.5=2199 \text{ (μm)}. \quad \text{Expression (6):}$$

Then, an equivalent air length t1 of the thickness between the top of the microlens 51 and the aperture position of the aperture 30 on the side of the photoreceptor 11 is calculated as the following expression:

$$t1=300/1.45+345/1.6+5/1=428 \text{ (μm)}. \quad \text{Expression (7):}$$

Further, an equivalent air length t2 of the thickness between the top of the microlens 51 and the aperture position of the aperture 30 on the side of the microlens 51 is calculated as the following expression:

$$t2=300/1.45=207 \text{ (μm)}. \quad \text{Expression (8):}$$

Furthermore, an equivalent air length t3 of the thickness between the photoreceptor 11 and the aperture position of the aperture 30 on the side of the photoreceptor 11 is calculated as the following expression:

$$t3=50/1.5=33 \text{ (μm)}. \quad \text{Expression (9):}$$

The substitution of the calculation results of the expressions (8) and (9) into the expression (2) gives the following expression:

$$6.9 \text{ (μm)} \leq d1 \leq 27.6 \text{ (μm)}. \quad \text{Expression (10):}$$

Thus, d1=12 (μm) satisfies the conditions of the expression (10).

The substitution of the calculation results of the expressions (8) and (9) into the expression (3) gives the following expression:

$$d2 \geq 61 \text{ (μm)}. \quad \text{Expression (11):}$$

Thus, d2=75 (μm) satisfies the conditions of the expression (11).

The substitution of the calculation results of the expressions (7) and (8) into the expression (4) gives the following expression:

$$t2 < 252 (\mu m) \left( = t1 \times \left(1 - \frac{(d1+d2)}{(2 \times p + d1)}\right)\right) \quad \text{Expression (12)}$$

Thus, t2=205 (μm), which is described above, satisfies the conditions of the expression (12).

The substitution of the calculation results of the expressions (7) and (8) into the expression (5) gives the following expression:

$$t3 < 141 \text{ (μm) } (=t1/3) \quad \text{Expression (13):}$$

Thus, t3=33 (μm), which is described above, satisfies the conditions of the expression (13).

The use of the imaging unit 100 of this embodiment enables the obtainment of an image with less noise. Specifically, in the comparison between the case of using an imaging unit which has a transparent resin layer rather than the light shielding layer 20 and the case of using the imaging unit 100, an image with significantly less noise is obtained in the case of capturing an image using the imaging unit 100.

Second Embodiment

Figure 4:
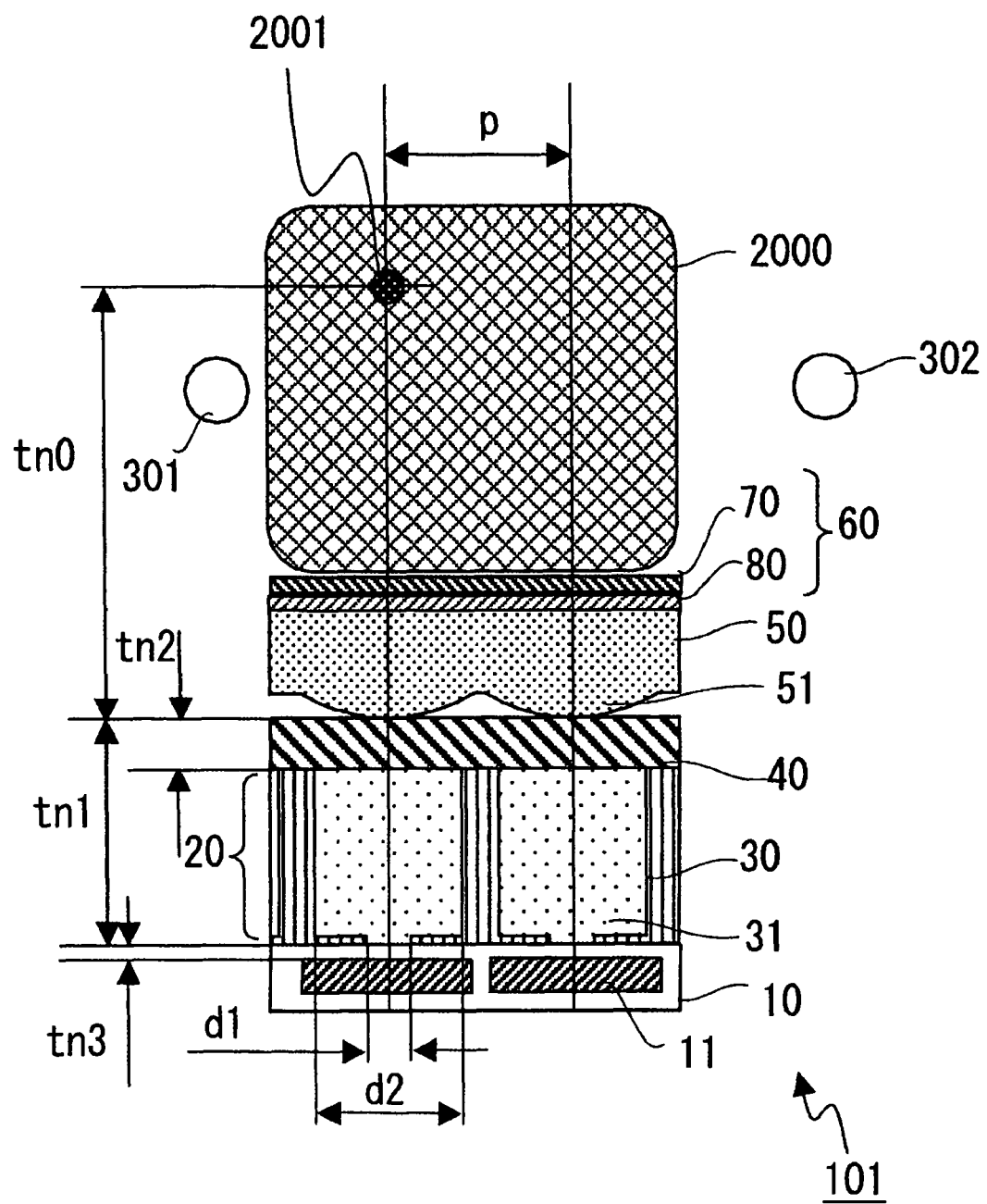
FIG. 4 is a sectional view schematically showing the structure of an imaging unit of a biometric authentication apparatus according to a second embodiment of the present invention.

The structure of a biometric authentication apparatus according to a second embodiment of the present invention is described hereinafter. FIG. 4 schematically shows the structure of an imaging unit 101 in the biometric authentication apparatus of the second embodiment. The dimensions shown in FIG. 4 indicate actual lengths.

In the first embodiment, a plurality of microlenses 51 are formed on the upper surface of the microlens array 50. On the other hand, in the second embodiment, a plurality of microlenses 51 are formed on the lower surface of the microlens array 50 as shown in FIG. 4.

Further, in the first embodiment, the optical filter 60 is a separate component from the microlens array 50. On the other hand, in the second embodiment, a visible light absorbing layer 80 and a hard-coat layer 70 are formed on top of the microlens array 50 as shown in FIG. 4. The optical filter 60 is thereby integrated with the microlens array 51. The visible light absorbing layer 80 is formed by applying a resin which absorbs visible light rays over one surface of the microlens array 50.

The relationships represented in the expressions (1) to (5) in the first embodiment are applicable to the second embodiment also. It is thereby possible to prevent light having a noise component (light incoming from an area other than a desired area, light from a gap between adjacent microlenses 51, and crosstalk light (light from another microlens 51)) from entering the photoreceptor 11. It is thereby possible to effectively avoid the superposition of noise on an output signal from the photoreceptor 11.

A method of manufacturing an imaging unit according to the second embodiment of the present invention is described hereinafter. The photoreceptor portion 10, the light shielding layer 20 which is formed on a light shielding layer holding substrate 40, and the microlens array 50 are produced individually. They are then placed on top of one another as illustrated in FIG. 4, thereby completing the imaging unit 101.

Firstly, the microlens array 50 is produced in accordance with the description with reference to FIG. 3.

Specifically, the microlenses 51 are formed on the transparent substrate 52. The transparent substrate 52 is a quartz glass substrate with a size of 5 inches and a thickness of 300 μm and having a refractive index of 1.45. A distance between the tops of the adjacent microlenses 51 is 100 μm, and a diameter of each microlens is 95 μm. A focal length of each microlens 51 is set in such a way that the light having a signal component is focused on the light receiving surface of the photoreceptor 11. Specifically, a focal length of each microlens 51 is set by adjusting a thickness of the lens formation layer 510 and an etching rate ratio.

Further, a resin which is transparent to a near-infrared ray and which absorbs a visible light ray is applied over one surface of the microlens array 50 and then hardened. The visible light absorbing layer 80 is thereby formed.

Furthermore, a hard-coat material is applied onto the visible light absorbing layer 80, thereby forming the hard-coat layer 70. The optical filter 60 which is integrated on the microlens array 50 is thereby formed. A refractive index of the combination of the visible light absorbing layer 80 and the hard-coat layer 70 is 1.60, and a total thickness is 100 μm.

After that, the light shielding layer 20 and the apertures 30 are formed on the light shielding layer holding substrate 40.

Specifically, the cylindrical translucent portions 31 are formed on the light shielding layer holding substrate 40 by photolithography process. Then, a black photosensitive resin (light absorbing material) is injected between the translucent portions 31. Further, the aperture is created in the black photosensitive resin on the translucent portions 31. A distance between the adjacent apertures 30 is 100 μm, an aperture width of the aperture 30 on the side of the microlenses 51 is 85 μm, an aperture width of the aperture 30 on the side of the photoreceptor 11 is 12 μm, and a thickness of the aperture 30 is 300 μm (a total of the transparent resin of 295 μm and the air of 5 μm).

A distance between the adjacent apertures 30 corresponds to a distance between the tops of the microlenses 51. A BK7 substrate with a size of 5 inches and a thickness of 200 μm and having a refractive index of 1.51 is used as the light shielding layer holding substrate 40. A refractive index of the translucent portion 31 is 1.60. The light shielding layer may be formed on the photoreceptor portion 10.

The photoreceptor portion 10 is a CMOS sensor. An imaging area of the CMOS sensor is sectioned into 100 μm×100 μm, and each section is configured as the photoreceptor 11. The photoreceptor 11 includes a plurality of pixels which are arranged at an interval of 10 μm. A thickness of a protective layer (silicon oxide film) which is formed on the imaging area of the CMOS sensor is 1 μm or below.

After that, the photoreceptor portion 10 in which a plurality of photoreceptors 11 are arranged, the light shielding layer 20, the light shielding layer holding substrate 40, and the microlens array 50 are placed on top of each other as shown in FIG. 4. The imaging unit 101 is thereby produced.

An image of the vein 2001 in the finger 2000 is taken with the use of the imaging unit 101, which is produced in the above-described process.

Referring again to FIG. 4, an image of the position at a depth of 2.5 mm from the skin of the finger 2000 which is placed above the optical filter 60 is picked up using the imaging unit 101.

An equivalent air length t0 of the distance between the vein 2001 in the finger 2000 as an object and the top of the microlens 51 is calculated as the following expression:

$$t0=2500/1.34+100/1.6+300/1.45=2135 \text{ (μm)}. \quad \text{Expression (14):}$$

Then, an equivalent air length t1 of the thickness between the top of the microlens 51 and the aperture position of the aperture 30 on the side of the photoreceptor 11 is calculated as the following expression:

$$t1=200/1.51+295/1.6+5/1=322 \text{ (μm)}. \quad \text{Expression (15):}$$

Further, an equivalent air length t2 of the distance between the top of the microlens 51 and the aperture position of the aperture 30 on the side of the microlens 51 is calculated as the following expression:

$$t2=200/1.51=132 \text{ (μm)}. \quad \text{Expression (16):}$$

Furthermore, an equivalent air length t3 of the thickness between the photoreceptor 11 and the aperture position of the aperture 30 on the side of the microlens 30 is calculated as the following expression:

$$t3=1/1.5=0.67 \text{ (μm)}. \quad \text{Expression (17):}$$

The substitution of the calculation results of the expressions (14) to (16) into the expression (2) gives the following expression:

$$5.1 \text{ (μm)} \leq d1 \leq 21.2 \text{ (μm)}. \quad \text{Expression (18):}$$

Thus, d1=12 (μm), which is described above, satisfies the conditions of the expression (18).

The substitution of the calculation results of the expressions (14) to (16) into the expression (3) gives the following expression:

$$d2 \geq 65 \text{ (μm)}. \quad \text{Expression (19):}$$

Thus, d2=85 (μm), which is described above, satisfies the conditions of the expression (19).

The substitution of the calculation results of the expressions (14) to (15) into the expression (4) gives the following expression:

$$t2 < 189 (\mu m) \left( = t1 \times \left(1 - \frac{(d1+d2)}{(2 \times p + d1)}\right)\right) \quad \text{Expression (20)}$$

Thus, t2=133 (μm), which is described above, satisfies the conditions of the expression (20).

The substitution of the calculation results of the expressions (14) to (15) into the expression (5) gives the following expression:

$$t3 < 107 \text{ (μm) } (=t1/3) \qquad \text{Expression (21):}$$

Thus, t3=0.67 (μm), which is described above, satisfies the conditions of the expression (21).

The use of the imaging unit 101 of this embodiment enables the obtainment of an image with less noise. Specifically, in the comparison between the case of using an imaging unit which has a transparent resin layer rather than the light shielding layer 20 and the case of using the imaging unit 101, an image with significantly less noise is obtained in the case of capturing an image using the imaging unit 101.

Third Embodiment

Figure 5:
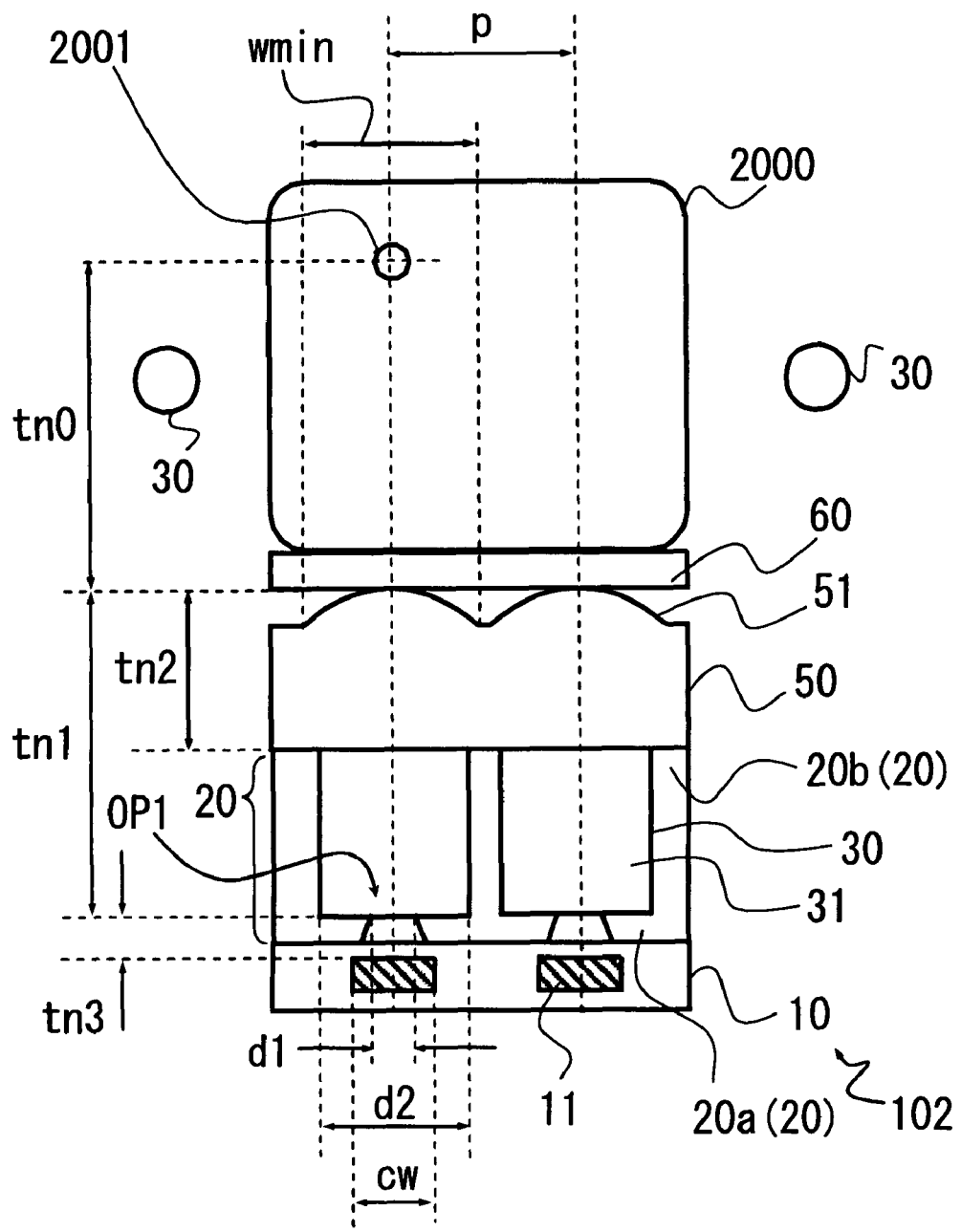
FIG. 5 is a schematic view showing the structure of an imaging unit of a biometric authentication apparatus according to a third embodiment of the present invention.

The structure of a biometric authentication apparatus according to a third embodiment of the present invention is described hereinafter. FIG. 5 schematically shows the structure of an imaging unit in the biometric authentication apparatus of the third embodiment. The dimensions shown in FIG. 5 indicate actual lengths. In the embodiments to be described in the followings (the third to fifth embodiments), a biometric authentication apparatus is used in the wavelength range of 600 nm to 1200 nm. In the following embodiments, the effects of parameters are examined in further detail than in the above-described embodiments.

The structure of an imaging unit 102 of this embodiment is briefly described hereinafter with reference to FIG. 5. The imaging unit 102 includes the photoreceptor portion 10, the light shielding layer 20, the microlens array 50 and the optical filter 60, which are arranged in this order.

In the photoreceptor portion 10, a plurality of photoreceptors 11 are arranged two-dimensionally at regular intervals. The photoreceptor portion 10 may be composed of CCD (Charge Coupled Device) sensors, CMOS (Complementary Metal Oxide Semiconductor) sensors, TFT (Thin Film Transistor) sensors and so on. Each photoreceptor 11 is an element that includes one or a plurality of pixels.

The light shielding layer 20 is placed between the photoreceptor portion 10 and the microlens array 50. The light shielding layer 20 has a plurality of apertures 30. The translucent portion 31 is filled in each aperture 30. The light shielding layer 20 has a portion 20a under the translucent portion 31 and a portion 20b between adjacent translucent portions 31. In the portion 20a, a plurality of aperture openings OP1 are formed by normal semiconductor process technology (etching or the like). The aperture opening OP1 is a part of the aperture 30.

The microlens array 50 is composed of a plurality of microlenses 51 which are arranged on a transparent substrate. The aperture shape (top-view shape) of each microlens 51 is circular (see FIG. 9).

The optical filter 60 is placed on the upper surface (the surface on the side of an object) of the microlens array 50. The optical filter 60 transmits a near-infrared ray (particularly, at least one wavelength in the range of 600 nm to 1200 nm) and blocks light rays with other wavelength bands. The optical filter 60 is a filter of a light absorbing type or a reflecting type by light interference.

In this embodiment, tn1 is defined in consideration of the thickness of the portion 20a of the light shielding layer 20. In light of this, each element is defined as follows. Referring to FIG. 5, an actual length of the smallest width of the aperture width (minimum aperture width) of the aperture 30 on the side of the photoreceptor 11 is d1. An actual length of the shortest distance (minimum length) among the distances between the adjacent microlenses 51 is p. An actual length of the smallest width (minimum width) of the aperture shape (top-view shape) of the microlens 51 is wmin. An actual length of the distance between the vein 2001 in the finger 2000 as an object and the top of the microlens 51 is tn0. An actual length of the thickness between the top of the microlens 51 and the aperture position of the aperture 30 on the side of the photoreceptor 11 is tn1.

An equivalent air length t0 of the distance between the vein 2001 in the finger 2000 as an object and the top of the microlens 51 is defined as a sum of each thickness of one or a plurality of materials existing between the vein 2001 and the top of the microlens 51 being divided by each respective refractive index.

In the structure of FIG. 5, t0=(a depth from the surface of the finger 2000 on the side of the photoreceptor 11 to the vein 2001)/(a refractive index of the finger 2000)+(a thickness of the optical filter 60)/(a refractive index of the optical filter 60). tn0=(a depth from the surface of the finger 2000 on the side of the photoreceptor 11 to the vein 2001)+(a thickness of the optical filter 60). Likewise, an equivalent air length of the thickness between the top of the microlens 51 and the aperture position of the aperture 30 on the side of the photoreceptor 11 is t1.

The aperture position of the aperture 30 on the side of the photoreceptor 11 is a position at which the width of the aperture 30 is minimum in the cross section of the aperture 30 along the direction from the photoreceptor 11 to the microlens 51. If there are a plurality of positions having a minimum width such as successive minimum widths, it is a position which is closest to the microlens 51. In the structure of FIG. 5, the internal diameter of the aperture opening OP1 increases along the propagation direction of light coming from the microlens 51 to be focused on the photoreceptor 11. Thus, the aperture position corresponds to the upper surface of the portion 20a of the light shielding layer 20. If the thickness of the portion 20a of the light shielding layer 20 is small enough, the upper surface and the lower surface of the portion 20a can be assumed to be the same. In such a case, the aperture position of the aperture 30 on the side of the photoreceptor 11 may be either upper or under surface of the portion 20a of the light shielding layer 20.

Figure 6:
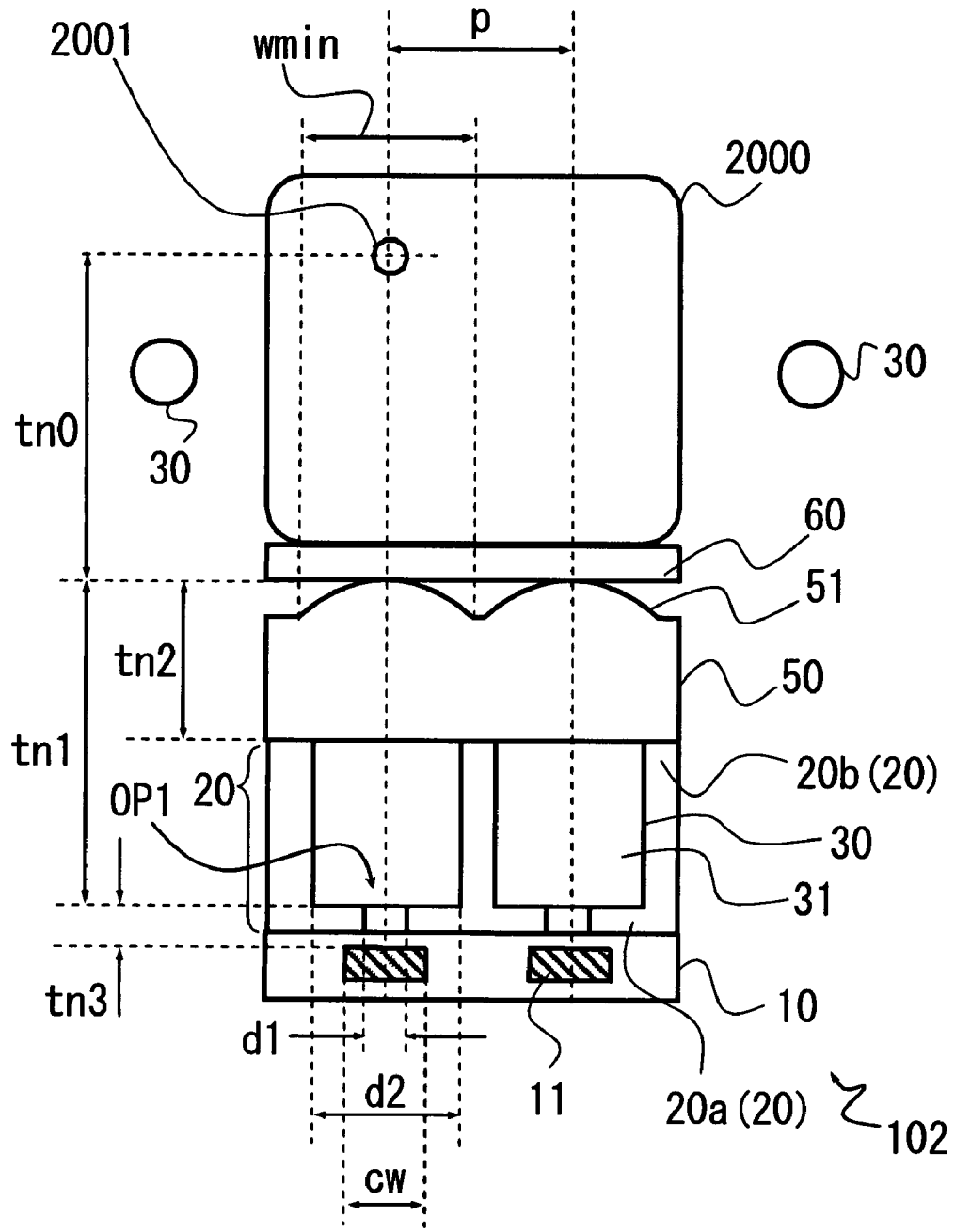
FIG. 6 is a schematic view to describe a variation of an aperture.
Figure 7:
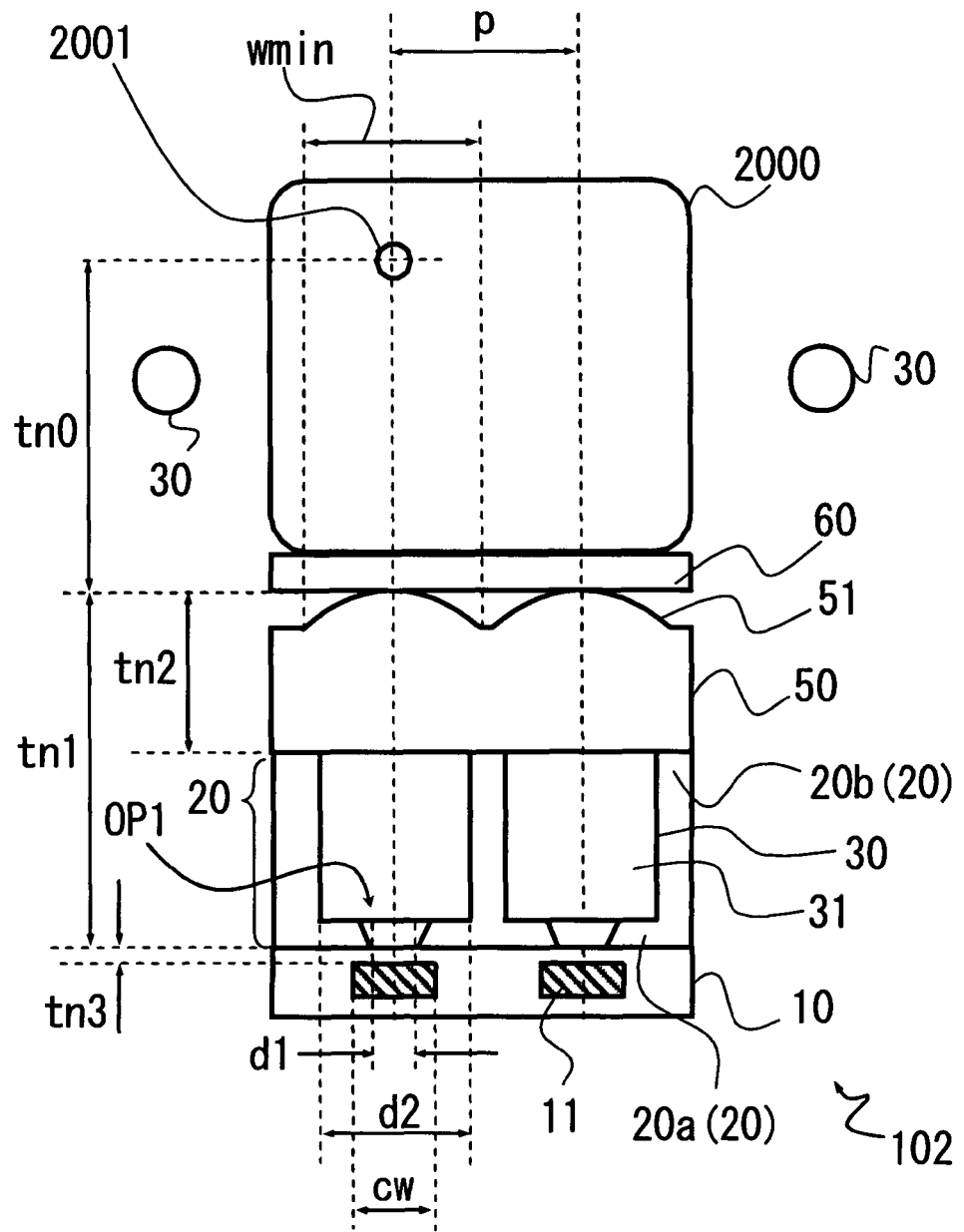
FIG. 7 is a schematic view to describe a variation of an aperture.

FIG. 6 and FIG. 7 illustrate the case where the shape of the aperture opening OP1 is different. The structures shown in FIGS. 6 and 7 are the same as the structure of this embodiment except for the shape of the aperture opening OP1.

FIG. 6 shows the structure in which the internal diameter of the aperture opening OP1 is constant along the propagation direction of light coming from the microlens 51 to be focused on the photoreceptor 11. FIG. 7 shows the structure in which the internal diameter of the aperture opening OP1 decreases along the propagation direction of light coming from the microlens 51 to be focused on the photoreceptor 11.

In the structure of FIG. 6, the aperture position of the aperture 30 on the side of the photoreceptor 11 corresponds to the upper surface of the portion 20a of the light shielding layer 20. In the structure of FIG. 7, the aperture position of the aperture 30 on the side of the photoreceptor 11 corresponds to the lower surface of the portion 20a of the light shielding layer 20.

The above-mentioned values d1, p and wmin are described hereinafter. The value d1 is described first. d1 is a minimum aperture width of the aperture 30. In the structure of FIG. 5, d1 is a minimum width of the internal diameter of the aperture opening OP1 which is formed in the portion 20a of the light shielding layer 20.

In this embodiment, the internal diameter of the aperture opening OP1 increases along the propagation direction of light coming from the microlens 51 to be focused on the photoreceptor 11. Thus, the minimum aperture width d1 of the aperture 30 on the side of the photoreceptor 11 corresponds to the internal diameter of the edge of the aperture opening OP1 on the side of the microlens 50.

The value d1 in the structures of FIGS. 6 and 7 is described hereinbelow.

In the structure of FIG. 6, the minimum aperture width d1 of the aperture 30 on the side of the photoreceptor 11 corresponds to the internal diameter of the aperture opening OP1 which is formed in the portion 20a of the light shielding layer 20. In the structure of FIG. 7, the minimum aperture width d1 of the aperture 30 on the side of the photoreceptor 11 corresponds to the internal diameter of the edge of the aperture opening OP1 on the side of the photoreceptor 11 which is formed in the portion 20a of the light shielding layer 20. In this manner, the minimum aperture width d1 of the aperture 30 on the side of the photoreceptor 11 is determined in consideration of the shape of the aperture opening OP1 which is formed in the portion 20a of the light shielding layer 20. Such consideration is important when the thickness of the light shielding layer 20 is large.

The aperture shape of the aperture opening OP1 which is formed in the portion 20a of the light shielding layer 20 is similar to the aperture shape (top-view shape) of the microlens 51. In this embodiment, the aperture shape of the microlens 51 is circular. Thus, the aperture shape of the aperture opening OP1 which is formed in the portion 20a of the light shielding layer 20 is also circular, and its diameter at the edge on the side of the microlens 50 is d1.

Figure 8:
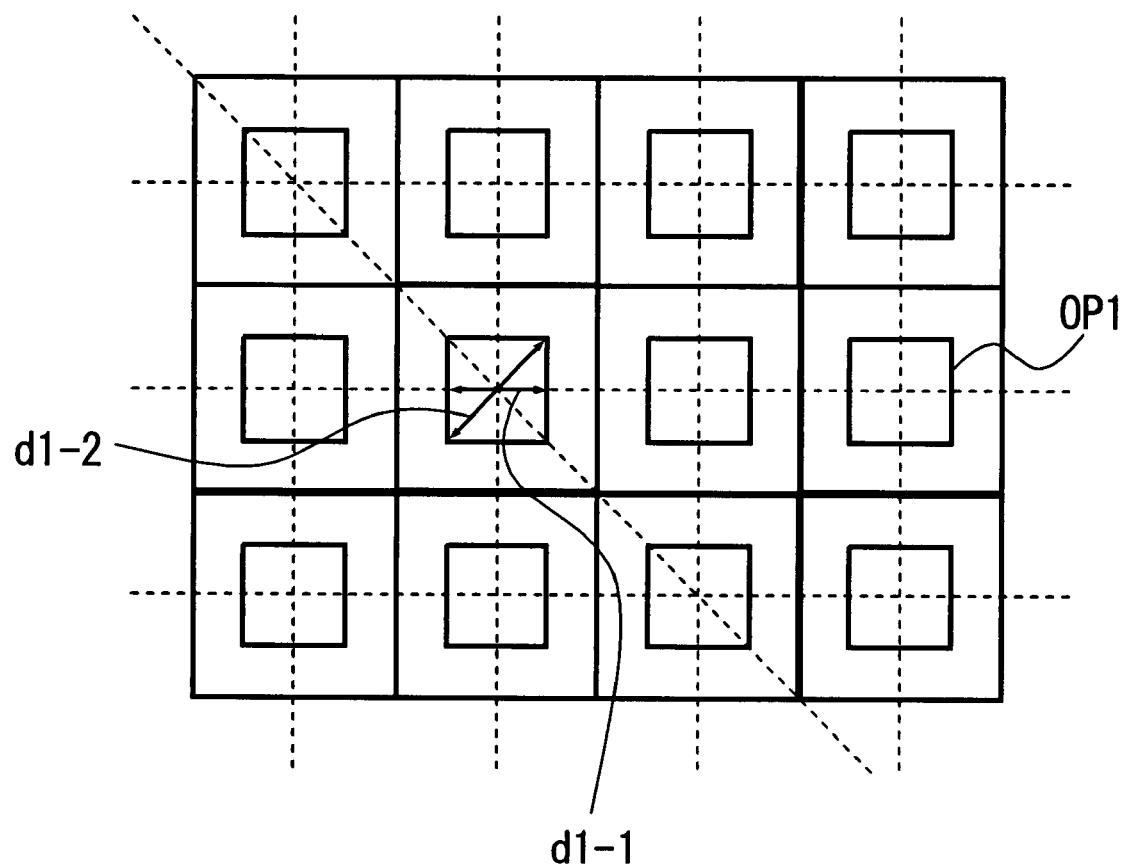
FIG. 8 is a schematic top view showing the shape of an aperture in a light shielding layer.

FIG. 8 shows the aperture shape of the aperture opening OP1 which is formed in the portion 20a of the light shielding layer 20 when the aperture shape of the microlens 51 is square. As shown in FIG. 8, the aperture shape of the aperture opening OP1 is similar to the aperture shape of the microlens 51, which is square. The internal diameter of the aperture opening OP1 has a width d1-1 and a width d1-2 as illustrated in FIG. 8. The width d1-1 and the width d1-2 are different from each other. As described earlier, d1 is an actual length of the smallest width of the aperture width (minimum aperture width) of the aperture 30 on the side of the photoreceptor 11. Accordingly, the width d1-1 corresponds to d1 in the aperture opening OP1 shown in FIG. 8.

The values p and wmin are described next. p is the shortest distance (minimum length) among the distances between the adjacent microlenses 51. The distance between the microlenses 51 is equal to the distance between the optical axes of the microlenses 51. wmin is an actual length of the minimum width of the aperture shape (top-view shape) of the microlens 51.

Figure 9:
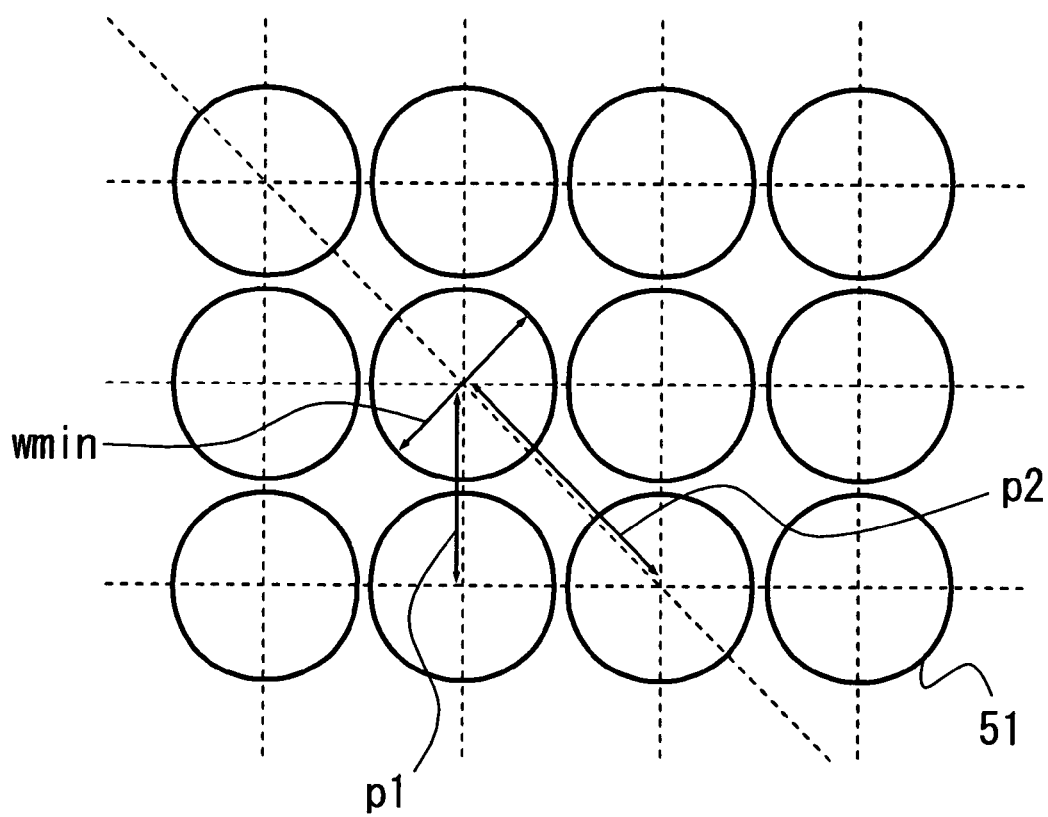
FIG. 9 is a schematic top view to describe a variation of the shape of a microlens.
Figure 10:
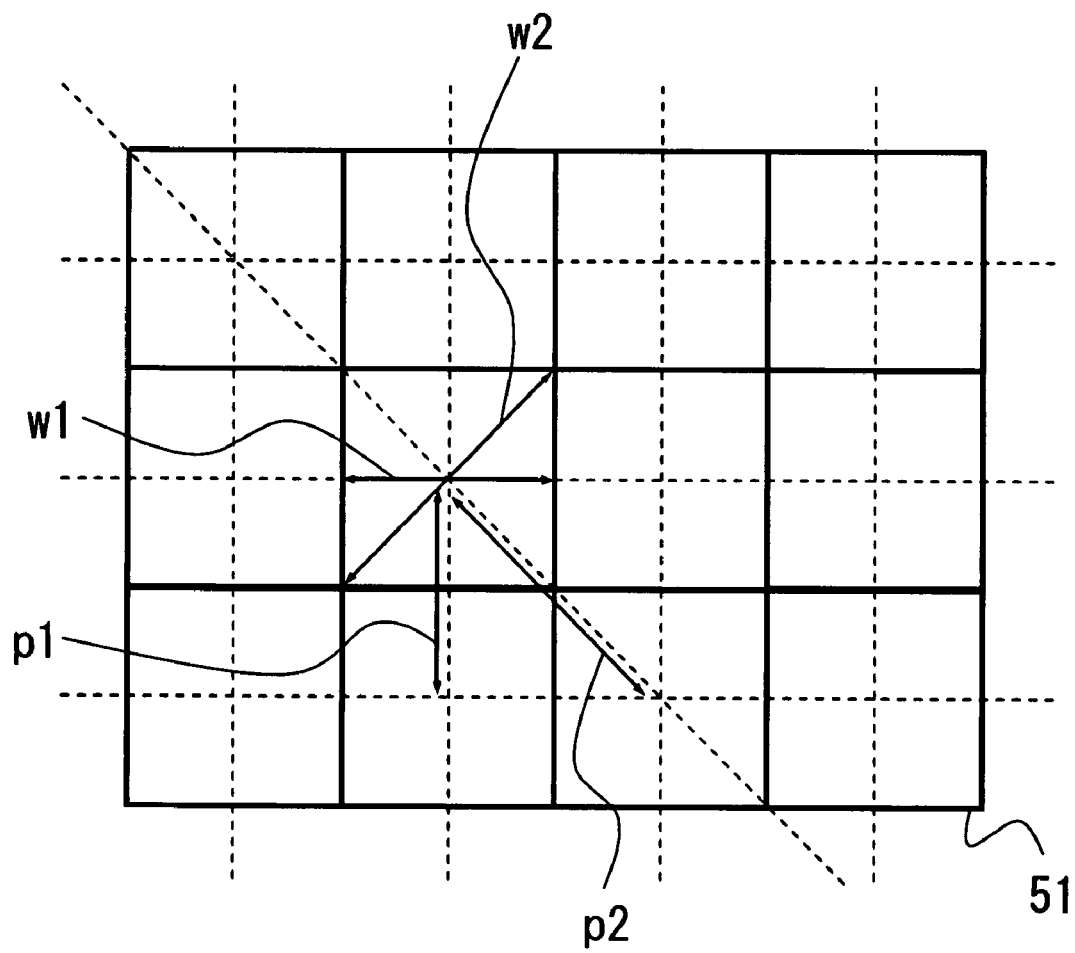
FIG. 10 is a schematic top view to describe a variation of the shape of a microlens.
Figure 11:
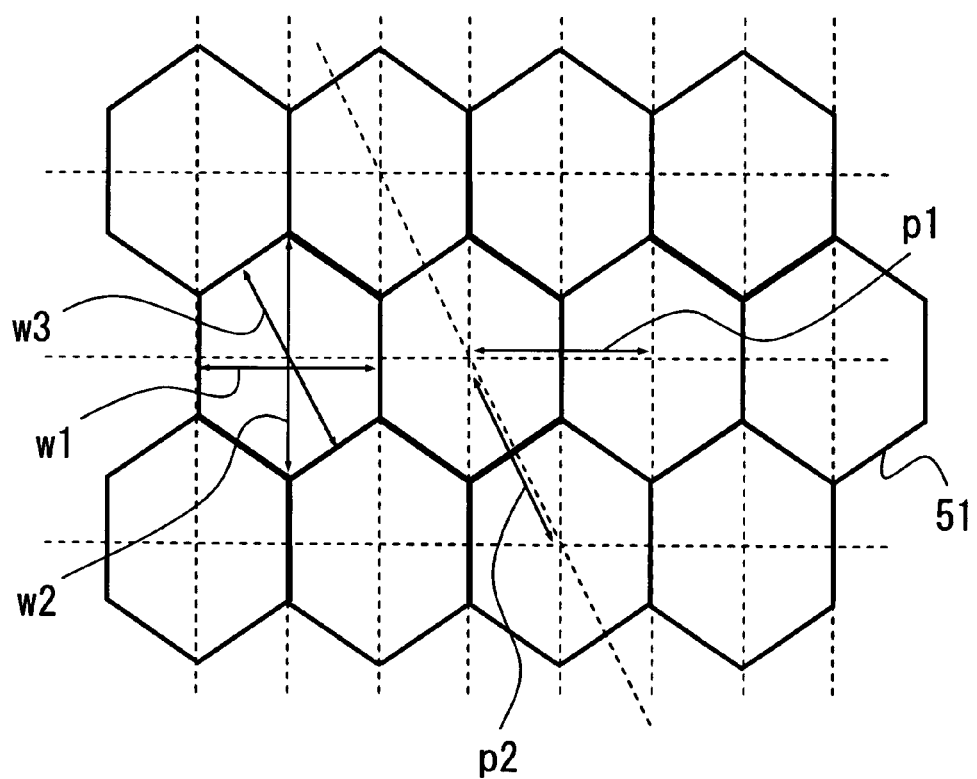
FIG. 11 is a schematic top view to describe a variation of the shape of a microlens.

FIG. 9 shows the structure in which the aperture shape of the microlens 51 is circular. FIG. 10 shows the structure in which the top view shape of the microlens 51 is square. FIG. 11 shows the structure in which the top view shape of the microlens 51 is hexagonal.

In the structure of FIG. 9, there are two different distances p1 and p2 as the distance between the microlenses 51. As described earlier, p is an actual length of the shortest distance (minimum length) among the distances between the adjacent microlenses 51. Thus, the distance p1 corresponds to p in the structure of FIG. 9. The aperture shape of the microlens 51 is circular. Thus, wmin corresponds to an actual length of the width of the aperture shape (top-view shape) of the microlens 51.

In the structure of FIG. 10, there are two different distances p1 and p2 as the distance between the microlenses 51. As described earlier, p is an actual length of the shortest distance (minimum length) among the distances between the adjacent microlenses 51. Thus, the distance p1 corresponds to p in the structure of FIG. 10. The aperture shape of the microlens 51 is square. There are two different widths w1 and w2 as the width of the aperture shape of the microlens 51. As described earlier, wmin is an actual length of the minimum width of the aperture shape of the microlens 51. Thus, w1 corresponds to wmin in the structure of FIG. 10.

In the structure of FIG. 11, there are two different distances p1 and p2 as the distance between the microlenses 51. As described earlier, p is an actual length of the shortest distance (minimum length) among the distances between the adjacent microlenses 51. Thus, the distance p1 corresponds to p in the structure of FIG. 11. The aperture shape of the microlens 51 is hexagonal. There are three different widths w1, w2 and w3 as the width of the aperture shape of the microlens 51. As described earlier, wmin is an actual length of the minimum width of the aperture shape of the microlens 51. Thus, w1 corresponds to wmin in the structure of FIG. 11.

When the elements are defined as described above, the relationship of d1, p, wmin, t0 and t1 preferably satisfies the following expression:

$$\frac{1.2 \times t1}{w\min} \le d1 \le \frac{2.4 \times t1}{w\min} + \frac{p \times t1}{t0} \quad \text{Expression (22)}$$

If the expression (22) is satisfied, it is possible to prevent the light having a noise component from entering the photoreceptor 11. It is thereby possible to effectively avoid the superposition of noise on an output signal from the photoreceptor 11.

When the light from an object is focused by the microlens 51 onto the surface of the aperture 30 on the side of the photoreceptor 11, an optical spot size S is wave-optically estimated approximately $$S = \frac{2 \times \lambda \times t1}{w\min}.$$

λ is a wavelength of light, and wmin is a minimum width of the aperture shape of the microlens 51. If λ is 600 nm, $$S = \frac{1.2 \times t1}{w\min}.$$

λ=600 nm is the shortest wavelength among those used in the vein authentication of this embodiment. Thus, if d1 is smaller than $$\frac{1.2 \times t1}{w\min},$$

a received light intensity decreases, resulting in a dark image.

Thus, d1 is preferably $$\frac{1.2 \times t1}{w \min}$$

or larger.

Likewise, if λ is 1200 nm, an optical spot size S is estimated approximately $$\frac{2.4 \times t1}{w \min}.$$

λ=1200 nm is the longest wavelength among those used in the vein authentication of this embodiment. Further, among light rays which are reflected on an object, the light from the position at a distance of p/2 from the optical axis of the microlens 51 reaches the position at a distance of $$\left(\frac{p}{2}\right) \times \left(\frac{t1}{t0}\right)$$

from the optical axis of the microlens 51 on the surface of the aperture 30 on the side of the photoreceptor 11. The light which reaches the position at a distance of p/2 or farther from the optical axis of the microlens 51 is light having a noise component.

As described above, if d1 exceeds $$\frac{2.4 \times t1}{w \min} + \frac{p + t1}{t0},$$

the light having a noise component enters a photoreceptor. As a result, there is much noise to cause a low quality image. Accordingly, it is preferred to set d1 to be $$\frac{2.4 \times t1}{w \min} + \frac{p + t1}{t0}$$

or less.

An optimum wavelength range for vein authentication is 750 nm to 950 nm. An optical spot size at a wavelength of 750 nm is $$\frac{1.5 \times t1}{w \min},$$

and an optical spot size at a wavelength of 950 nm is $$\frac{1.9 \times t1}{w \min}.$$

Therefore, the relationship of d1, p, wmin, t0 and t1 preferably satisfies the following expression:

$$\frac{1.5 \times t1}{w \min} \le d1 \le \frac{1.9 \times t1}{w \min} + \frac{p \times t1}{t0} \qquad \text{Expression (23)}$$

If the expression (23) is satisfied, it is possible to remove noise more effectively.

If an actual length of the minimum width of the aperture width of the aperture 30 on the side of the microlens 51 is d2 as shown in FIG. 5, light can enter the photoreceptor 11 effectively when d2 is larger than d1.

Further, if an equivalent air length of the thickness between the top of the microlens 51 and the aperture position of the aperture 30 on the side of the microlens 51 is t2 as shown in FIG. 5, the relationship of t2, t1, d2, d1 and wmin preferably satisfies the following expression:

$$w \min - \frac{d1}{2} - \frac{t2}{t1}\left(\frac{d1}{2} + w \min\right) < \qquad \text{Expression (24)}$$
$$d2 < 1.5 \times w \min\left(1 - \frac{t2}{t1}\right)$$

The aperture position of the aperture 30 on the side of the microlens 51 corresponds to the upper end surface of the portion 20b of the light shielding layer 20.

If the expression (24) is satisfied, it is possible to prevent light having a signal component from being blocked by the light shielding layer 20. The light having a signal component can thereby enter the photoreceptor 11 effectively. It is further possible to prevent light having a crosstalk component from entering the photoreceptor 11.

As d2 is broader, light from a corresponding microlens can enter the photoreceptor 11 more effectively. However, this reduces the effect of light shielding by the light shielding layer 20, causing an increase in the amount of light which enters the photoreceptor from another microlens or an area with no lens between adjacent microlenses. This results in an increase in the amount of light having a crosstalk component.

Accordingly, the light amount having a crosstalk component increases as d2 is set broader. If d2 is set narrower, the light shielding effect by the light shielding layer 20 increases to suppress the occurrence of crosstalk. However, this also causes light having a signal component to be blocked by the light shielding layer 20, which leads to excessive loss.

Regarding the above-described relationship, the calculation is performed on five conditions in the following table 1 with the use of ray tracing simulation.

TABLE 1

| Lens Aperture and Aperture shape | | wmin | d1 | t1 | t2 | d2i | d2ii | d2iii |
|---|---|---|---|---|---|---|---|---|
| Condition 1 | Square | 100 μm | 18 μm | 400 μm | 207 μm | 34.5 μm | 72.3 μm | 32.3 μm |
| Condition 2 | Circle | 95 μm | 18 μm | 400 μm | 251 μm | 20.7 μm | 53.0 μm | 23.6 μm |
| Condition 3 | Square | 100 μm | 18 μm | 400 μm | 282 μm | 14.1 μm | 44.1 μm | 19.6 μm |
| Condition 4 | Square | 100 μm | 18 μm | 351 μm | 190 μm | 32.1 μm | 55.7 μm | 30.6 μm |

TABLE 1-continued

| Condition 5 | Square | 50 μm | 12 μm | 334 μm | 172 μm | 15.1 μm | 36.2 μm | 16.1 μm |
|---|---|---|---|---|---|---|---|---| where $$d2i = w\min - \frac{d1}{2} - \frac{t2}{t1}\left(\frac{d1}{2} + w\min\right), \quad d2ii = 1.5 \times w\min\left(1 - \frac{t2}{t1}\right),$$

$$d2iii = \frac{2}{3} \times w\min\left(1 - \frac{t2}{t1}\right).$$

For easier understanding of the description, FIGS. 12 to 16 show the values of d2i, d2ii, d2iii and d1 in dotted lines.

FIGS. 12 to 16 show that a light intensity of a crosstalk component and a light intensity of a signal component which enter the photoreceptor 11 change as d2 changes. In FIGS. 12 to 16, the vertical axis indicates a relative light intensity, and the horizontal axis indicates d2. A relative light intensity of a crosstalk component is a light intensity of a crosstalk component at certain d2 being normalized by a light intensity of a signal component at d2=wmin (i.e. a maximum light intensity of a signal component receivable under each condition). A relative light intensity of a signal component is a light intensity of a signal component at certain d2 being normalized by a light intensity of a signal component at d2=wmin (i.e. a maximum light intensity of a signal component receivable under each condition). In FIGS. 12 to 16, a square point when viewed from the front indicates a light intensity of a crosstalk component, and a rhombus point indicates a light intensity of a signal component.

Figure 12:
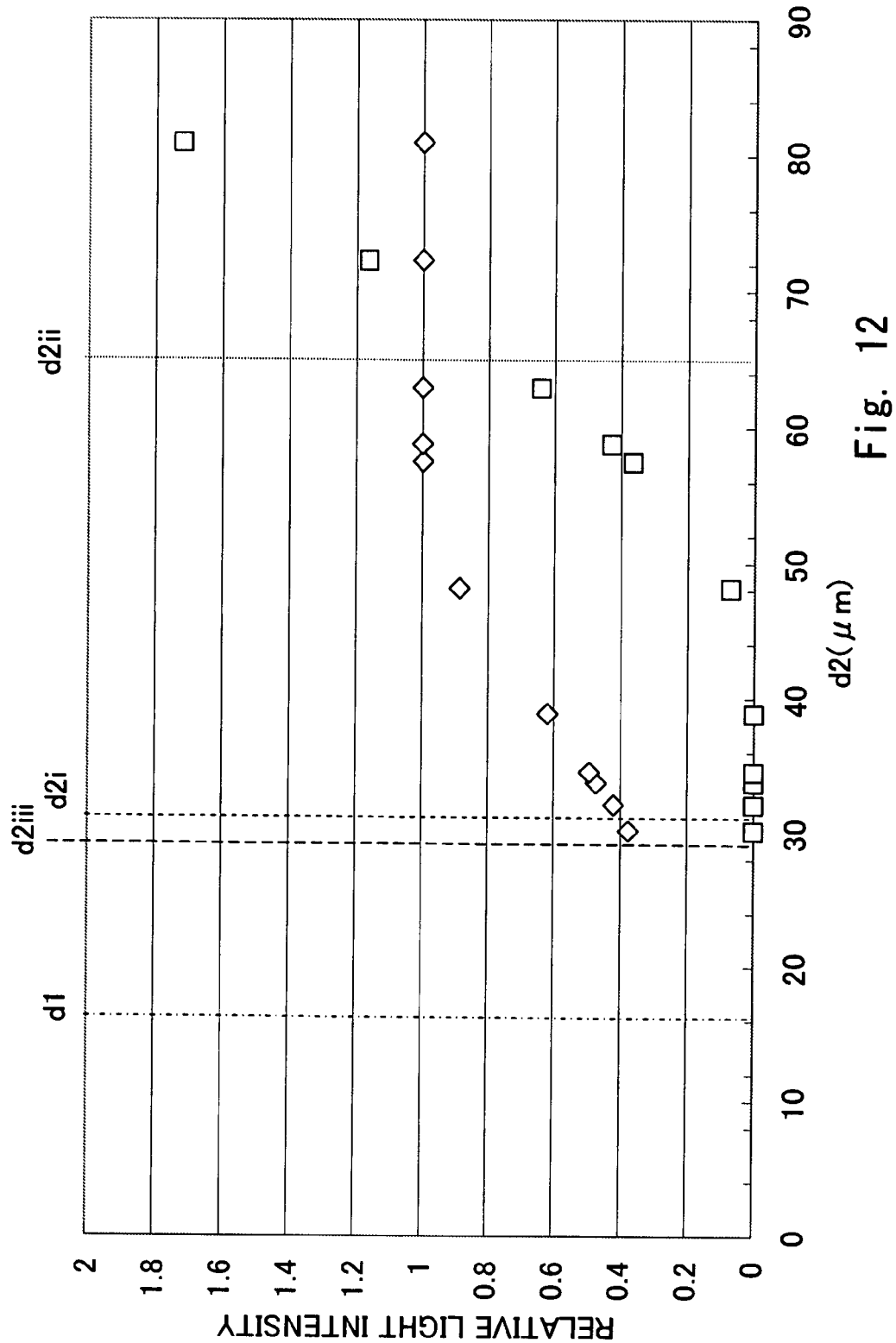
FIG. 12 is an illustrative diagram to describe a change in the light intensity of a crosstalk component and the light intensity of a signal component.
Figure 13:
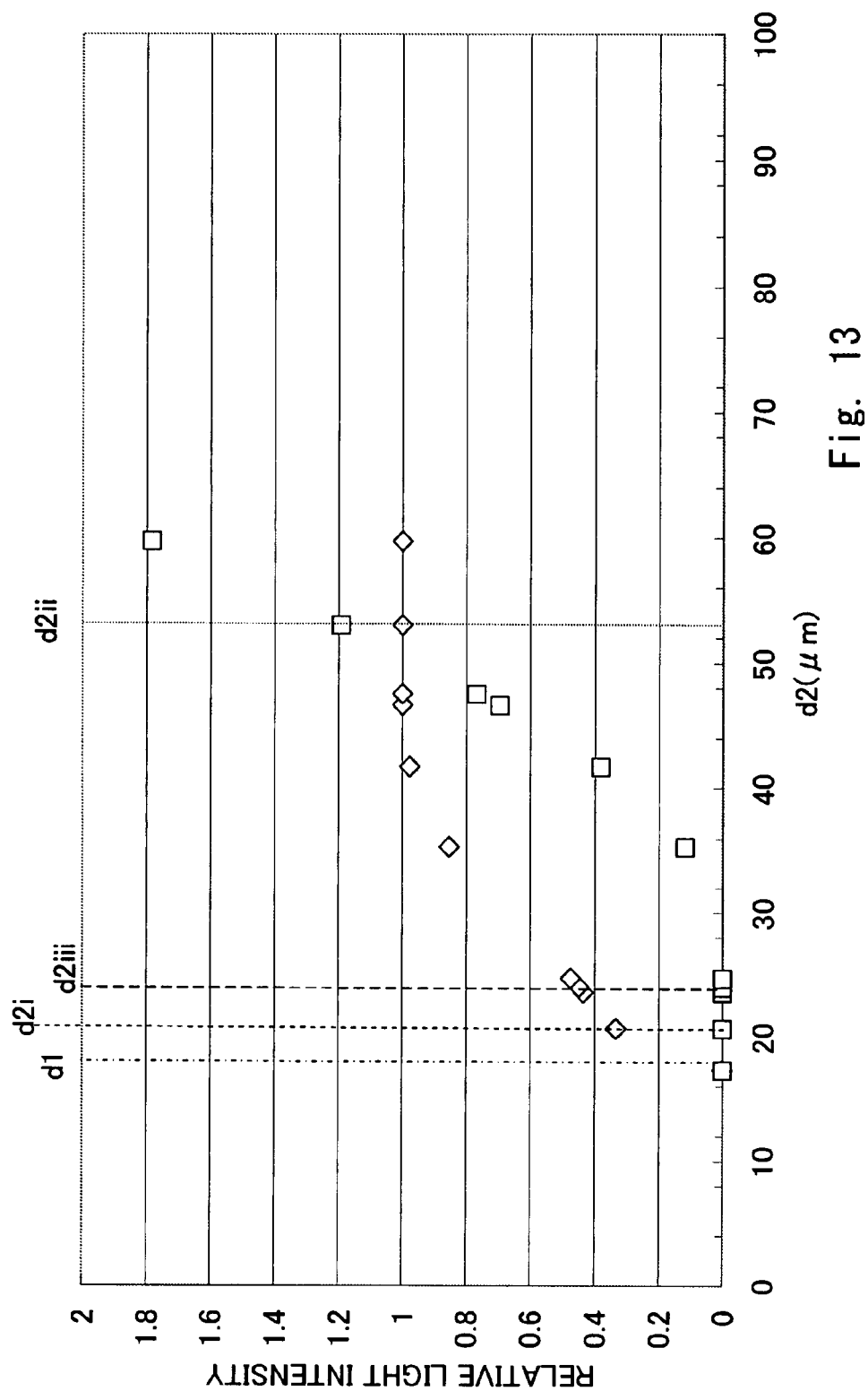
FIG. 13 is an illustrative diagram to describe a change in the light intensity of a crosstalk component and the light intensity of a signal component.
Figure 14:
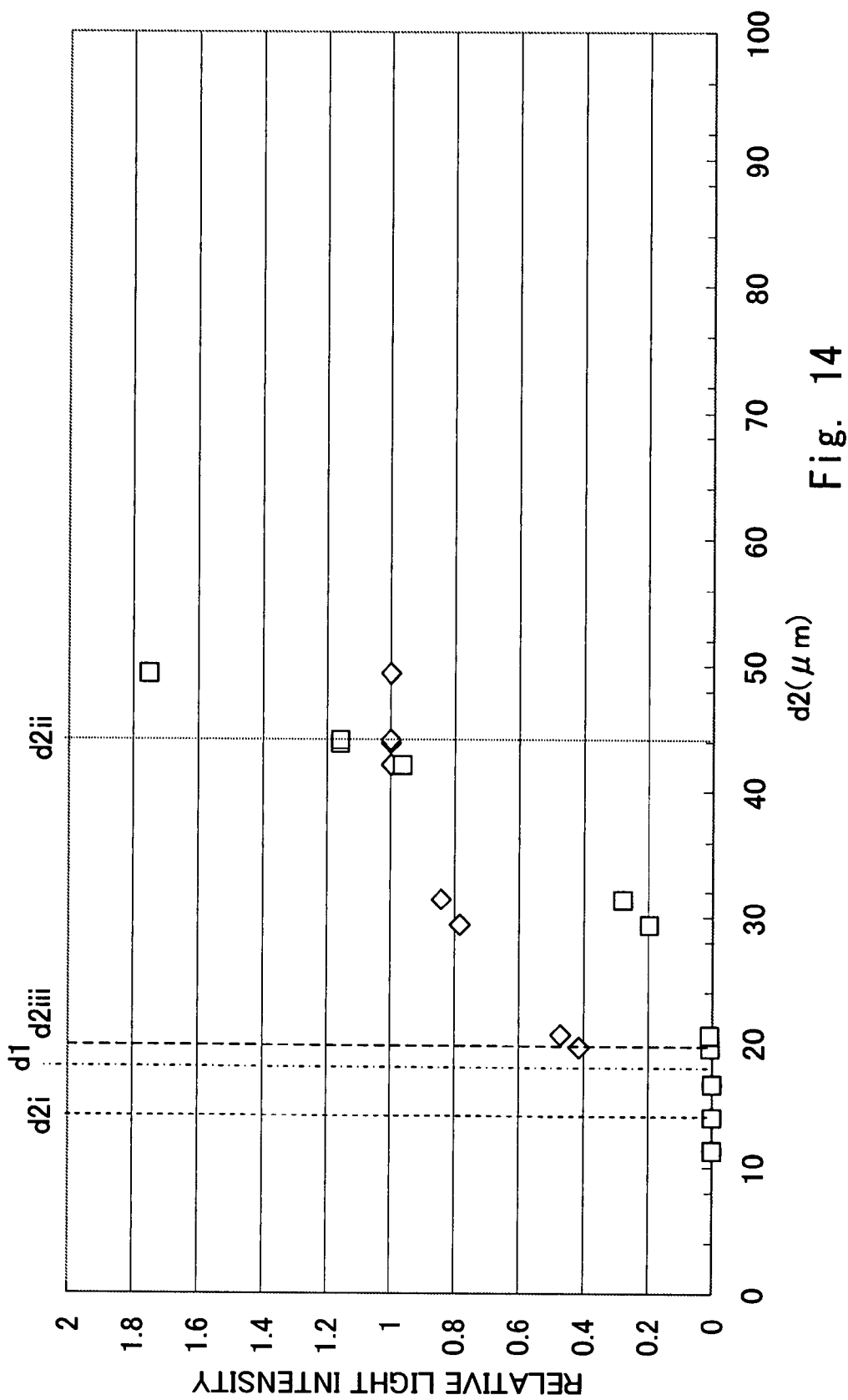
FIG. 14 is an illustrative diagram to describe a change in the light intensity of a crosstalk component and the light intensity of a signal component.
Figure 15:
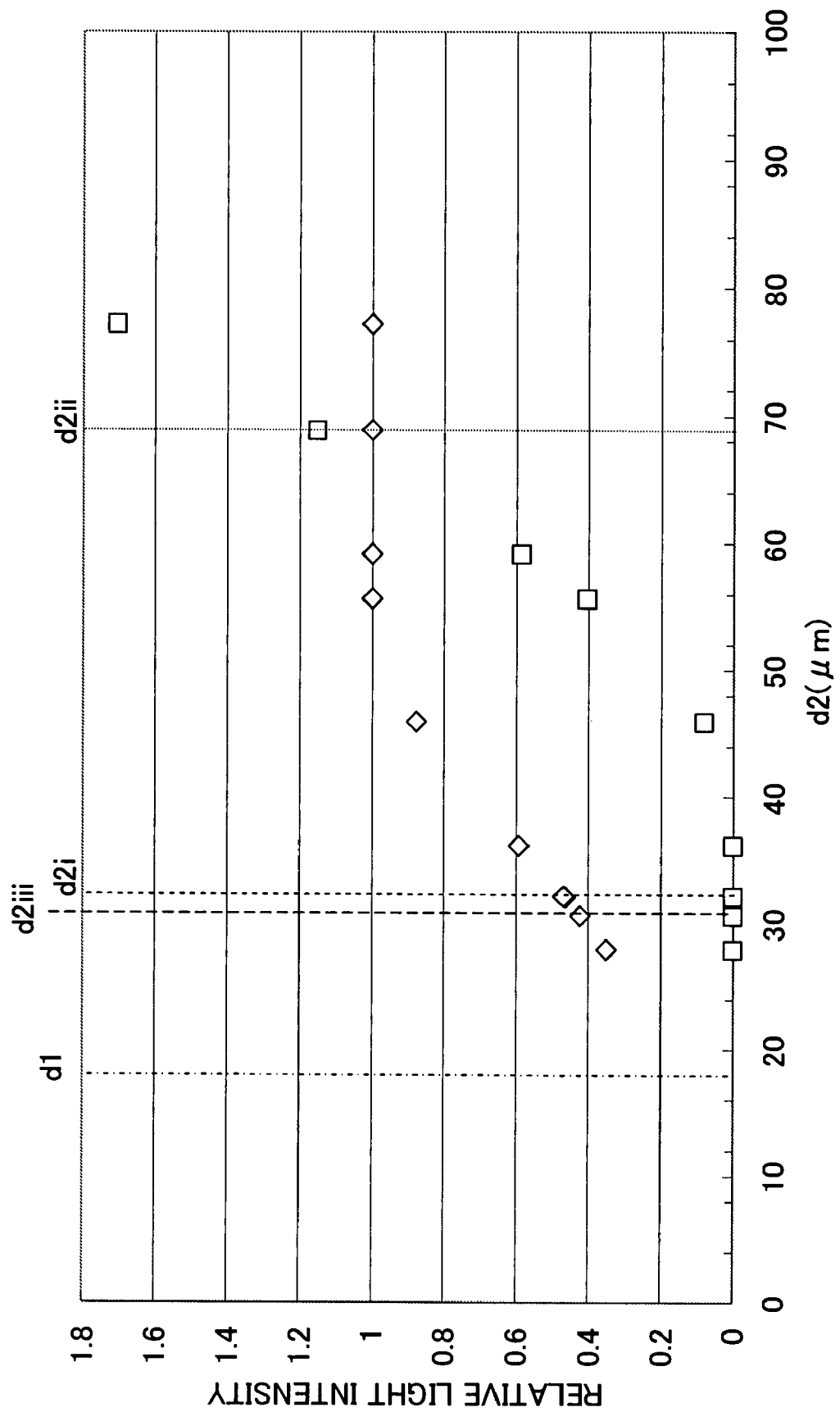
FIG. 15 is an illustrative diagram to describe a change in the light intensity of a crosstalk component and the light intensity of a signal component.
Figure 16:
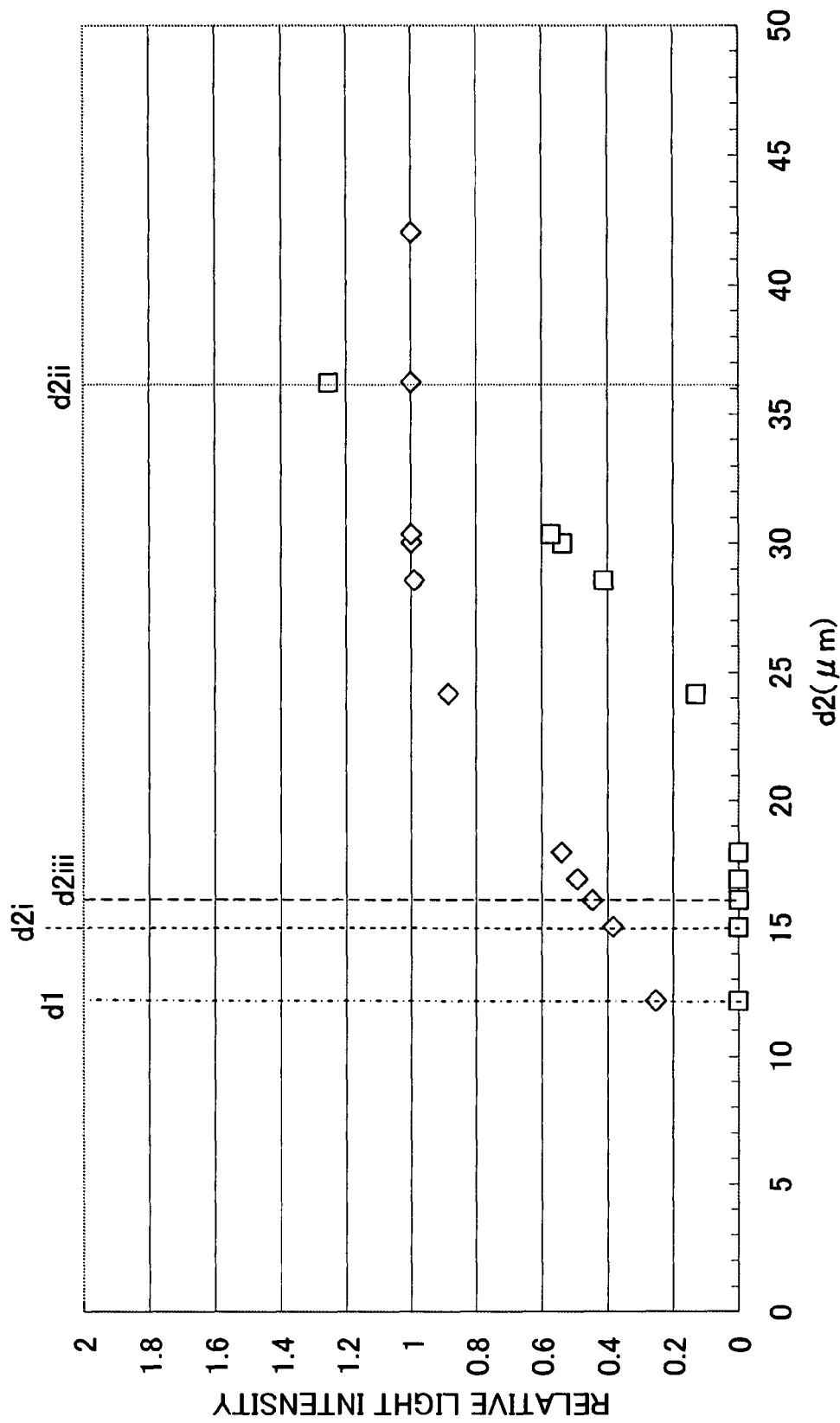
FIG. 16 is an illustrative diagram to describe a change in the light intensity of a crosstalk component and the light intensity of a signal component.

FIG. 12 shows the case under the condition 1. FIG. 13 shows the case under the condition 2. FIG. 14 shows the case under the condition 3. FIG. 15 shows the case under the condition 4. FIG. 16 shows the case under the condition 5.

As shown in FIGS. 12 to 16, a light intensity of a signal component increases as the value of d2 increases under any conditions. Likewise, a light intensity of a crosstalk component increases as the value of d2 increases. However, if d2 exceeds $$d2ii\left(d2ii = 1.5 \times w\min\left(1 - \frac{t2}{t1}\right)\right),$$

a light intensity of a crosstalk component exceeds a light intensity of a signal component.

If d2 exceeds d2ii, noise increases to cause a low-quality image. Therefore, d2 is preferably set to a smaller value (narrower width) than d2ii.

Further, as shown in FIGS. 12 to 16, a light intensity of a signal component decreases as the value of d2 decreases under any conditions. Likewise, a light intensity of a crosstalk component decreases as the value of d2 decreases. However, at $$d2i\left(d2i = w\min - \frac{d1}{2} - \frac{t2}{t1}\left(\frac{d1}{2} + w\min\right)\right),$$

light of a crosstalk component is completely blocked. Further, if the value of d2 falls below d2i, light of a signal component further decreases.

If the value of d2 is smaller than d2i, it causes excessive blocking of light having a signal component. Consequently, an obtained image becomes darker. Therefore, d2 is preferably set to a larger value (wider width) than d2i.

Furthermore, the relationship of t2, t1, d2 and wmin preferably satisfies the following expression:

$$\frac{2}{3} \times w\min\left(1 - \frac{t2}{t1}\right) < d2 < 1.5 \times w\min\left(1 - \frac{t2}{t1}\right) \quad \text{Expression (25)}$$

If the expression (25) is satisfied, it is possible to prevent light having a signal component from being excessively blocked by the light shielding layer 20. The light of a signal component can thereby enter the photoreceptor 11 effectively, thus suppressing the occurrence of a crosstalk component.

As shown in FIGS. 12 to 16, if the value of d2 is larger than $$d2iii\left(d2iii = \frac{2}{3} \times w\min\left(1 - \frac{t2}{t1}\right)\right),$$

a loss of a signal component is 60% or lower under any conditions. Accordingly, the light of a signal component can enter the photoreceptor 11 effectively.

Further, as shown in FIG. 5, if an equivalent air length of the thickness between the photoreceptor 11 (the light receiving surface of the photoreceptor 11) and the aperture position of the aperture 30 on the side of the photoreceptor 11 (the upper surface of the portion 20a in FIG. 5) is t3, and a minimum width of an imaging area of the photoreceptor 11 is cw, it is preferred that the relationship of t1, t2, t3, d1, d2, cw and p satisfies the following expression:

$$t3 < \frac{(t1 - t2)(2 \times p - d2 - cw)}{(d1 + d2)} \quad \text{Expression (26)}$$

If the expression (26) is satisfied, it is possible to prevent the light from another microlens 51 from entering the photoreceptor after passing through the adjacent aperture 30. It is thereby possible to suppress the occurrence of crosstalk.

Specifically, if the value of t3 is set excessively large, light which is focused by the microlens 51 toward the corresponding photoreceptor 11 is largely diverged after passing through the aperture 30, thereby entering another photoreceptor 11. The light thus becomes a crosstalk component. Therefore, it is preferred to set the value of t3 so as to satisfy the relationship of the expression (26).

A method of manufacturing the imaging unit 102 according to a third embodiment of the present invention is described hereinafter.

The manufacturing method of the microlens array 50 is the same as the one described in the above embodiment. The microlenses 51 are arranged two-dimensionally at a pitch of 100 μm with no space in between. The shortest distance among the distances between the tops of the adjacent microlenses 51 is 100 μm. An aperture shape of each microlens is circular. A diameter of each microlens is 97 μm.

Manufacturing methods of the light shielding layer 20 and the aperture 30 are the same as those described in the above embodiment. However, a diameter of the cylindrical aperture 30 is 70 μm in this embodiment. In the structure of FIG. 5, an internal diameter of the aperture opening OP1 increases from 12 μm to 20 μm along the optical axis of the microlens 51.

The light shielding layer 20 is thereby formed on the microlens array 50 in the above process. The minimum distance between the adjacent apertures 30 is 100 μm, an aperture width of the aperture 30 on the side of the microlens 51 is 70 μm, an aperture width of the aperture 30 on the side of the photoreceptor 11 is 12 μm, and an thickness of the aperture 30 is 345 μm.

The photoreceptor portion 10 is a sensor using a double-gate thin-film transistor. A distance between the adjacent photoreceptors 11 is 100 μm, and a size of the photoreceptor portion 10 is 15 mm×20 mm. A size of each photoreceptor 11 is 20 μm×20 μm, which is square. Thus, the minimum width of the photoreceptor is 20 μm. A protective insulating layer (a silicon oxide film) having a refractive index of 1.50 is formed on an electrode of the double-gate thin-film transistor. Further, a transparent resin layer having a refractive index of 1.50 is formed at a thickness of 50 μm on the protective insulating layer.

Then, the photoreceptor portion 10, the light shielding layer 20, and the microlens array 50 are placed on top of one another as shown in FIG. 5. They are then adhered to each other using alignment marks. Further, the optical filter 60 is formed on the microlens array 50. A thickness of the optical filter 60 is 500 μm. A refractive index of the optical filter 60 is 1.5. The imaging unit 102 is thereby produced.

An image of the vein 2001 in the finger 2000 is taken with the use of the imaging unit 102, which is produced in the above-described process.

Referring again to FIG. 5, an image of the position at a depth of 2.5 mm from the skin of the finger 2000 which is placed above the optical filter 60 is picked up using the imaging unit 102. Generally, the vein of the finger exists in the position at a depth of 2.5 mm from the finger skin. A refractive index of the finger for a near-infrared ray is 1.34.

An equivalent air length t0 of the distance between the vein 2001 in the finger 2000 as an object and the top of the microlens 51 is calculated as the following expression:

$$t0 = 2500/1.34 + 500/1.5 = 2199 \text{ (μm)}. \hspace{2em} \text{Expression (27):}$$

Then, an equivalent air length t1 as described above is calculated as the following expression:

$$t1 = 300/1.45 + 345/1.6 = 423 \text{ (μm)}. \hspace{2em} \text{Expression (28):}$$

Further, an equivalent air length t2 as described above is calculated as the following expression:

$$t2 = 300/1.45 = 207 \text{ (μm)}. \hspace{2em} \text{Expression (29):}$$

Furthermore, an equivalent air length t3 as described above is calculated as the following expression:

$$t3 = 5/1 + 50/1.5 = 38 \text{ (μm)}. \hspace{2em} \text{Expression (30):}$$

The substitution of the calculation results of the expressions (27) and (28) into the expression (23) gives the following expression:

$$6.5 \text{ (μm)} \leq d1 \leq 27.5 \text{ (μm)}. \hspace{2em} \text{Expression (31):}$$

Thus, the above-described d1=12 (μm) satisfies the conditions of the expression (31).

The substitution of the calculation results of the expressions (28) and (29) into the expression (24) gives the following expression:

$$41 < d2 < 74 \text{ (μm)} \hspace{2em} \text{Expression (32):}$$

Thus, the above-described d2=70 (μm) satisfies the conditions of the expression (32).

The substitution of the calculation results of the expressions (28) and (29) into the expression (25) gives the following expression:

$$33 < d2 < 74 \text{ (μm)} \hspace{2em} \text{Expression (33):}$$

Thus, the above-described d2=70 (μm) satisfies the conditions of the expression (33).

The substitution of the calculation results of the expressions (28) and (29) into the expression (26) gives the following expression:

$$t3 < 289 \text{ (μm)} \left( = \frac{(t1-t2)(2 \times p - d2 - cw)}{(d1+d2)} \right) \hspace{2em} \text{Expression (34)}$$

Thus, the above-described t3=38 (μm) satisfies the conditions of the expression (34).

The use of the imaging unit 102 of this embodiment enables the obtainment of an image with less noise. Specifically, in the comparison between the case of using an imaging unit which has a transparent resin layer rather than the light shielding layer 20 and the case of using the imaging unit 102, an image with significantly less noise is obtained in the case of capturing an image using the imaging unit 102.

Fourth Embodiment

Figure 17:
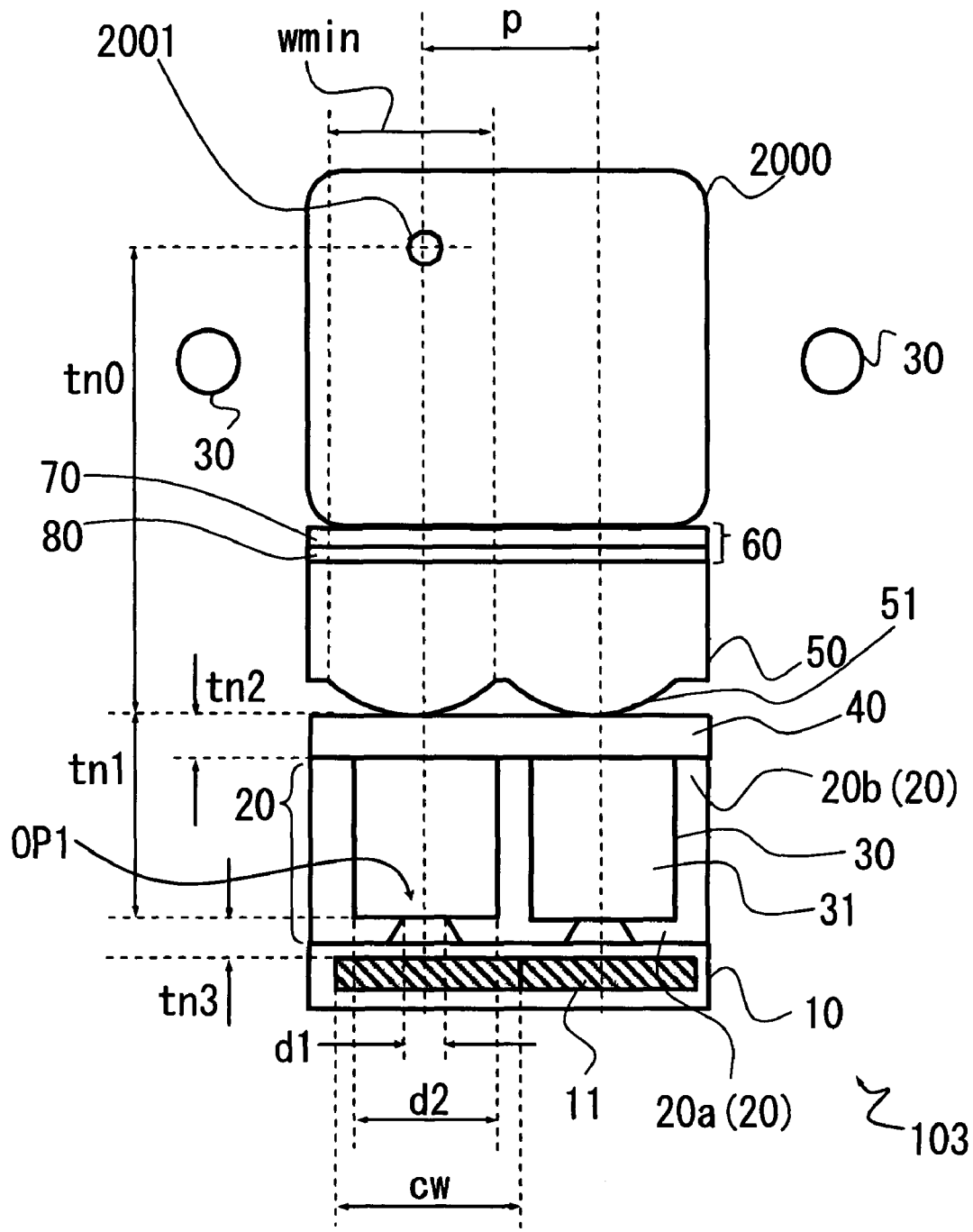
FIG. 17 is a schematic view showing the structure of an imaging unit of a biometric authentication apparatus according to a fourth embodiment of the present invention.

The structure of a biometric authentication apparatus according to a fourth embodiment of the present invention is described hereinafter with reference to FIG. 17. FIG. 17 schematically shows the structure of an imaging unit 103 in the biometric authentication apparatus of the fourth embodiment. The dimensions shown in FIG. 17 indicate actual lengths.

In this embodiment, unlike the third embodiment, a plurality of microlenses 51 are formed on the lower surface of the microlens array 50 (the surface on the side of the photoreceptor 10). Further, the optical filter 60 is placed on the upper surface of the microlens array 50 (an opposite surface from the surface with the plurality of microlenses 51).

The optical filter 60 includes the visible light absorbing layer 80 and the hard-coat layer 70. The visible light absorbing layer 80 is formed by applying a resin which absorbs visible light rays over the top surface of the microlens array 50, which is an opposite surface from the surface on which the plurality of microlenses 51 are formed.

In such a structure as well, it is possible to suppress light having a crosstalk component from entering the photoreceptor 11 as in the third embodiment, thereby effectively suppressing the occurrence of noise. The structure and its manufacturing method according to this embodiment are obvious to those skilled in the art on the basis of the first to third embodiments described earlier.

Specifically, the microlenses 51 are formed on a quartz glass substrate with a thickness of 300 μm and having a refractive index of 1.45. The microlenses 51 are arranged in square at a pitch of 100 μm. Thus, the shortest distance among the distances between the tops of the adjacent microlenses 51 is 100 μm. An aperture shape of each microlens 51 is circular, and a diameter of each microlens 51 is 95 μm. The optical filter 60 which is integrated on the microlens array 50 is composed of two layers of the visible light absorbing layer 80 and the hard-coat layer 70. A refractive index of the combination of those layers is 1.60, and a total thickness is 100 μm.

Further, the light shielding layer 20 is formed on a BK7 substrate with a thickness of 200 μm and having a refractive index of 1.51. The shortest distance among the distances between the adjacent apertures 30 is 100 μm. An aperture shape of the aperture 30 on the side of the microlens 51 is circular, and its aperture width is 75 μm. An aperture shape of the aperture 30 on the side of the photoreceptor 11 is circular, and its aperture width is 12 μm. a thickness of the light shielding layer 20 is 300 μm, a thickness of OP1 is 5 μm, and its internal diameter from the top surface along the microlens 51 is 12 μm to 20 μm.

The photoreceptor portion 10 is a CMOS sensor. An imaging area of the CMOS sensor is sectioned into 100 μm×100 μm, so that the minimum width is 100 μm, and each section is configured as the photoreceptor 11. A thickness of a protective layer (silicon oxide film) which is formed on an imaging area of the CMOS sensor is 1 μm or below.

An image of the vein 2001 in the finger 2000 is taken with the use of the imaging unit 103 according to this embodiment.

Referring again to FIG. 17, an image of the position at a depth of 2.5 mm from the skin of the finger 2000 which is placed above the optical filter 60 is picked up using the imaging unit 103.

An equivalent air length t0 of the distance between the vein 2001 in the finger 2000 as an object and the top of the microlens 51 is calculated as the following expression:

$$t0 = 2500/1.34 + 100/1.6 + 300/1.45 = 2135 \text{ (μm)}. \quad \text{Expression (35)}$$

Then, an equivalent air length t1 as described above is calculated as the following expression:

$$t1 = 200/1.51 + 295/1.6 = 317 \text{ (μm)}. \quad \text{Expression (36)}$$

Further, an equivalent air length t2 of the distance between the top of the microlens 51 and the aperture position of the aperture 30 on the side of the microlens 51 is calculated as the following expression:

$$t2 = 200/1.51 = 132 \text{ (μm)}. \quad \text{Expression (37)}$$

The aperture position of the aperture 30 on the side of the microlens 51 corresponds to the upper end surface of the portion 20b of the light shielding layer 20 in this embodiment.

Furthermore, an equivalent air length t3 as described above is calculated as the following expression:

$$t3 = 5/1 + 1/1.5 = 6 \text{ (μm)}. \quad \text{Expression (38)}$$

The substitution of the calculation results of the expressions (35) to (36) into the expression (23) gives the following expression:

$$5.0 \text{ (μm)} \leq d1 \leq 21.1 \text{ (μm)} \quad \text{Expression (39)}$$

Thus, d1=12 (μm), which is described above, satisfies the conditions of the expression (39).

The substitution of the calculation results of the expressions (36) to (37) into the expression (24) gives the following expression:

$$47 \text{ (μm)} < d2 < 83 \text{ (μm)}. \quad \text{Expression (40)}$$

Thus, d2=75 (μm), which is described above, satisfies the conditions of the expression (40).

The substitution of the calculation results of the expressions (36) to (37) into the expression (25) gives the following expression:

$$39 < d2 < 83 \text{ (μm)} \quad \text{Expression (41)}$$

Thus, d2=75 (μm), which is described above, satisfies the conditions of the expression (41).

The substitution of the calculation results of the expressions (36) and (37) into the expression (26) gives the following expression:

$$t3 < 53 \text{ (μm)} \left( = \frac{(t1-t2)(2 \times p - d2 - cw)}{(d1+d2)} \right) \quad \text{Expression (42)}$$

Thus, t3=6 (μm), which is described above, satisfies the conditions of the expression (42).

The use of the imaging unit 103 of this embodiment enables the obtainment of an image with less noise. Specifically, in the comparison between the case of using an imaging unit which has a transparent resin layer rather than the light shielding layer 20 and the case of using the imaging unit 103, an image with significantly less noise is obtained in the case of capturing an image using the imaging unit 103.

Fifth Embodiment

Figure 18:
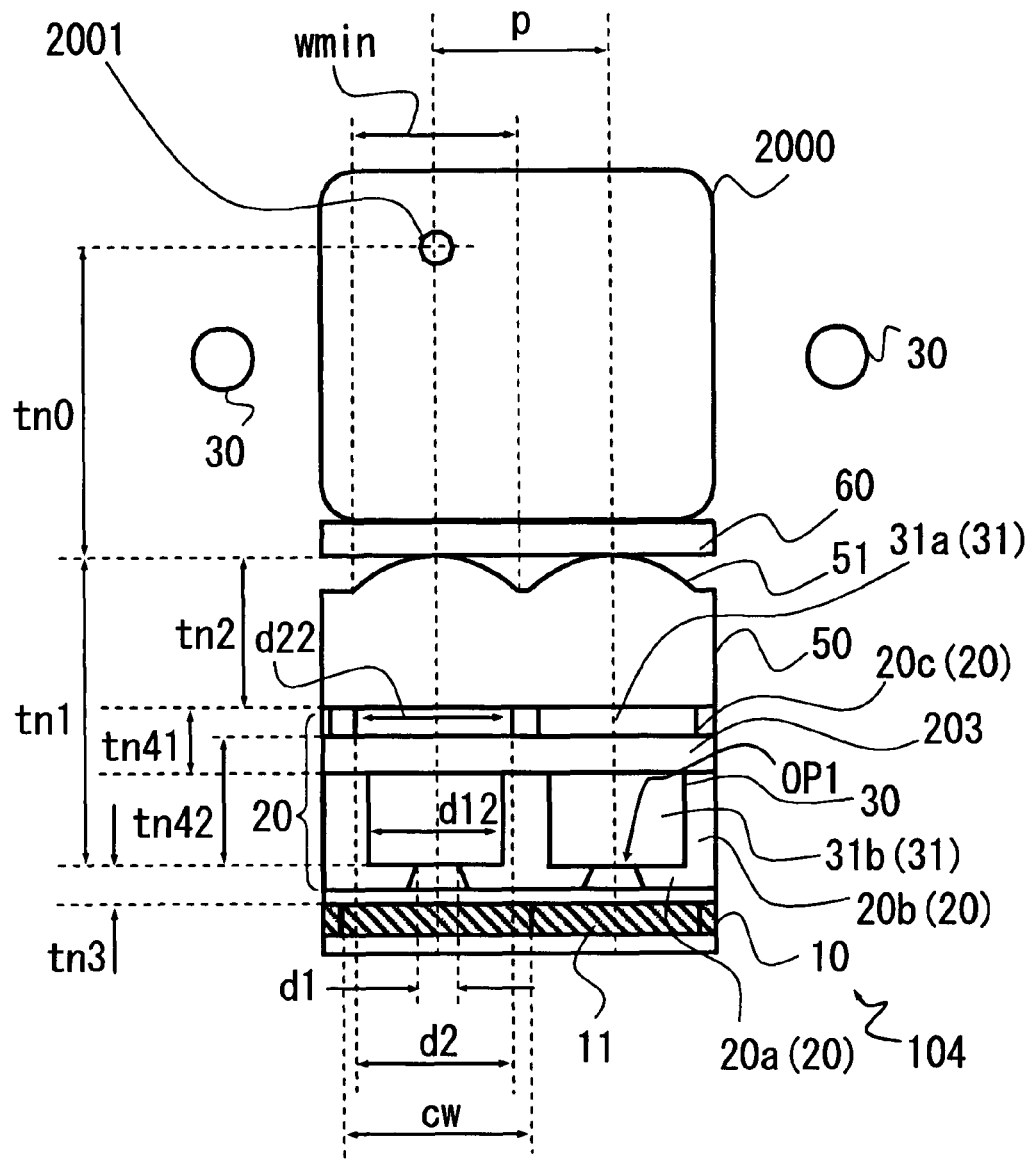
FIG. 18 is a schematic view showing the structure of an imaging unit of a biometric authentication apparatus according to a fifth embodiment of the present invention.
Figure 19:
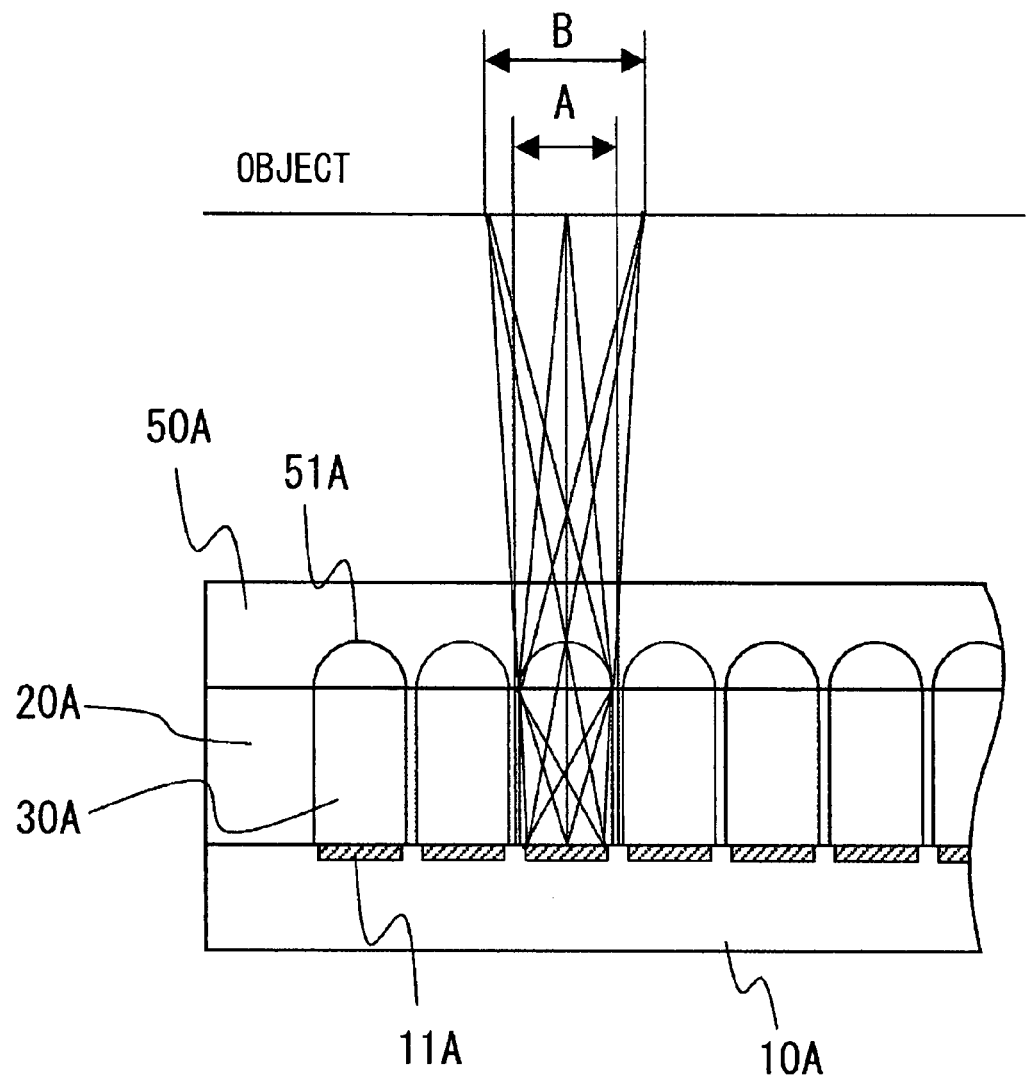
FIG. 19 is a vertical sectional view of an imaging device disclosed in Japanese Unexamined Patent Application Publication No. 3-157602.

The structure of a biometric authentication apparatus according to a fifth embodiment of the present invention is described hereinafter. FIG. 18 schematically shows the structure of an imaging unit 104 in the biometric authentication apparatus of the fifth embodiment. The dimensions shown in FIG. 18 indicate actual lengths.

In this embodiment, the structure of the light shielding layer 20 is different from that of the third embodiment. Specifically, the light shielding layer 20 is configured as a double-layered light shielding layer. A first layer and a second layer are physically separated from each other.

As shown in FIG. 18, the light shielding layer 20 has a portion 20a, a portion 20b and a portion 20c. The portion 20a and the portion 20b are a first light shielding layer. The portion 20c is a second light shielding layer. The portion 20c is physically separated from the portion 20a and the portion 20b. An intermediate layer 203 which is transparent to a wavelength of light having a signal component (near-infrared ray) is placed between the portion 20b and the portion 20c.

In order for the light shielding layer 20 to have a sufficient height (thickness) along the optical axis of the microlens 51, the light shielding layer 20 is preferably composed of a stack of a plurality of layers. This allows the thickness of each layer to be thin, thus making the manufacture of the light shielding layer 20 easier. The light shielding layer 20 may be composed of two or more layers. For example, another light shielding layer may be placed on top of the portion 20c.

The values of d12, d22, tn41 and tn42 are set as shown in FIG. 18. An actual length of the minimum width of the aperture on the side of the microlens 51 among the aperture widths of the aperture 30 between the portions 20b is d12. An actual length of the minimum width of the aperture on the side of the photoreceptor 11 among the aperture widths of the aperture 30 between the portions 20c is d22. An equivalent air length of the thickness between the upper end surface of the portion 20c (the aperture position of the aperture between the portions 20c on the side of the microlens 51) and the upper end surface of the portion 20b (the aperture position of the aperture between the portions 20b on the side of the microlens 51) is t41. An equivalent air length of the thickness between the lower end surface of the portion 20c (the aperture position of the aperture between the portions 20c on the side of the photoreceptor 11) and the aperture position of the aperture 30 on the photoreceptor 11 (the upper surface of the portion 20a (the aperture position of the aperture between the portions 20a on the side of the microlens 51, or the upper edge of the aperture opening OP1) in the structure of FIG. 18) is t42.

If a light shielding layer is made up of two layers, that is, when it is composed of two portions which are separated vertically, the relationship of p, d1, d2, d12, d22, t1, t2, t41, and t42 preferably satisfies both of the following expressions (43) and (44). Alternatively, their relationship preferably satisfies either of the following expression (45) or (46). It is further preferred to satisfy the following expressions (47) and (48).

If a light shielding layer is made up of three layers, that is, when it is composed of three portions which are separated vertically, the relationship of p, d1, d2, d12, d22, t1, t2, t41, and t42 preferably satisfies all of the following expressions (43) to (48).

The expressions (43) and (48) are as follows.

$$d22 < 2 \times p - (2 \times p + d2 - d1) \times \frac{t42}{(t1 - t2)} - d1 \quad \text{Expression (43)}$$

$$0 < t42 < \frac{(p - d1)(t1 - t2)}{(p + d2 - d1)} \quad \text{Expression (44)}$$

$$d12 < 2 \times p - (2 \times p - d2 + d1) \times \frac{t41}{(t1 - t2)} - d2 \quad \text{Expression (45)}$$

$$0 < t41 < \frac{(p - d2)(t1 - t2)}{(p - d2 - d1)} \quad \text{Expression (46)}$$

$$d1 + (d2 - d1) \times \frac{t42}{(t1 - t2)} < d22 \quad \text{Expression (47)}$$

$$d2 - (d2 - d1) \times \frac{t41}{(t1 - t2)} < d12 \quad \text{Expression (48)}$$

Note that in case the light shielding layer is made up of three layers, d12 is an actual length of a minimum width of the aperture on the side of the microlens 51 among the apertures of the aperture 30 in the light shielding layer at the second layer from the microlens 51, d22 is an actual length of a minimum width of the aperture on the side of the photoreceptor 11 among the apertures of the aperture 30 in the light shielding layer at the second layer from the photoreceptor 11, t41 is an equivalent air length of the thickness between the aperture position at a side of the microlens 51 of the aperture 30 in the light shielding layer closest to the microlens 51 and the aperture position at a side of the microlens 51 of the aperture 30 in the light shielding layer at the second layer from the microlens 51, and t42 is an equivalent air length of the thickness between the aperture position at a side of the photoreceptor 11 of the aperture in the light shielding layer closest to the photoreceptor 11 and the aperture position at a side of the photoreceptor 11 of the aperture in the light shielding layer at the second layer from the microlens 51.

The description in the third embodiment is applicable to this embodiment. Specifically, this embodiment also enables the prevention of light having a noise component (light incoming from an area other than a desired area, light from a gap between adjacent microlenses 51, and crosstalk light (light from another microlens 51)) from entering the photoreceptor 11 as in the third embodiment. It is thereby possible to effectively avoid the superposition of noise on an output signal from the photoreceptor 11.

The imaging unit 104 of this embodiment is manufactured as below.

The microlens array 50 is produced as described in the above embodiment. In this embodiment, the microlenses 51 are formed on one surface of a quartz glass substrate with a thickness of 400 µm and having a refractive index of 1.45. An aperture shape of each microlens 51 is square, and a length of one side (the minimum width of the aperture shape) of each microlens 51 is 100 µm. The microlenses 51 are arranged at a pitch of 100 µm with no space in between. Thus, the shortest distance among the distances between the tops of the adjacent microlenses 51 is 100 µm.

The light shielding layer 20 is produced in the following process. Firstly, a transparent photosensitive resin (transparent resist) is applied at a thickness of 50 µm all over one surface (the surface with no microlenses 51) of the microlens array 50. Then, exposure and development are performed using a mask. A portion 31a (a first portion) of the translucent portion 31 is thereby formed at a position corresponding to the microlens 51. An aperture shape of the portion 31a is substantially square, and a length of one side (the shortest length of the aperture width) is 55 µm. A length of one side (the shortest width of the aperture) of the portion 31a is constant along the propagation direction of light which is focused by the microlens 51 to the photoreceptor 11. The portion 31a is transparent to light having a signal component (near-infrared ray). A refractive index of the portion 31a is 1.60.

Then, a black photosensitive resin (light absorbing material) is injected between adjacent first portions. The black photosensitive resin is then hardened, thereby forming the portion 20c of the light shielding layer 20. After that, unnecessary part of the black photosensitive resin is removed by polishing or the like.

Further, a transparent photosensitive resin is applied at a thickness of 100 µm and then hardened by whole area exposure, thereby forming the intermediate layer 203. The transparent photosensitive resin which is applied in this step is the same as the one used for the formation of the translucent portion 31.

Then, a transparent photosensitive resin is applied at a thickness of 200 µm all over one surface (a surface opposite to the surface on the first light shielding layer side) of the intermediate layer 203, and exposure and development are performed. A rectangular portion 31b (a second portion) of the translucent portion 31, which corresponds to the microlens 51, is thereby formed. An aperture shape of the portion 31b is square, and a length of one side (the shortest length of the aperture width) is 45 µm. The transparent photosensitive resin which is used for the formation of the portion 31b is the same as the one used for the formation of the portion 31a.

Furthermore, a black photosensitive resin (light absorbing material) is injected between the adjacent portions 31b. The black photosensitive resin is then hardened, thereby forming the portion 20a and the portion 20b of the light shielding layer 20. A height of the portion 20b of the light shielding layer 20 (a thickness along the optical axis of the microlens 51) is set to 205 µm.

After that, etching is performed on the portion 20a of the light shielding layer 20, thereby forming the aperture opening OP1 at the position corresponding to the photoreceptor 11.

In this step, the etching conditions are selected in such a way that the aperture shape of the portion 20a of the light shielding layer 20 is also substantially square, and the length of one side (the shortest width of the aperture) is 23 µm at the upper surface of the portion 20a of the light shielding layer 20 and increases toward the photoreceptor 11 side until it reaches 30 µm at the lower surface of the portion 20a of the light shielding layer 20.

The light shielding layer 20 and the aperture 30 are formed above the microlens array 50 in the above process. The value of p is 100 μm, d2 is 55 μm, d1 is 23 μm, and the thickness of the aperture 30 is 350 μm (a total of the first light shielding layer of 50 μm, the intermediate layer of 100 μm, and the second light shielding layer of 200 μm).

The photoreceptor portion 10 is a CMOS sensor. An imaging area of the CMOS sensor is sectioned into 100 μm×100 μm, so that the minimum width is 100 μm, and each section is configured as the photoreceptor 11. A thickness of a protective layer (silicon oxide film) which is formed on the imaging area of the CMOS sensor is 1 μm or below.

Then, the photoreceptor portion 10, the light shielding layer 20 and the microlens array 50 are placed on top of one another as shown in FIG. 18. They are adhered to each other using alignment marks. Further, the optical filter 60 is attached onto the upper surface of the microlens array 50. A thickness of the optical filter 60 is 500 μm. A refractive index of the optical filter 60 is 1.5. The imaging unit 104 is thereby produced.

An image of the vein 2001 in the finger 2000 is taken with the use of the imaging unit 104, which is produced in the above process.

Referring again to FIG. 18, an image of the position at a depth of 2.5 mm from the skin of the finger 2000 which is placed above the optical filter 60 is picked up using the imaging unit 104. Generally, the vein of the finger exists in the position at a depth of 2.5 mm from the finger skin. A refractive index of the finger for a near-infrared ray is 1.34.

An equivalent air length t0 of the distance between the vein 2001 in the finger 2000 as an object and the top of the microlens 51 is calculated as the following expression:

$$t0 = 2500/1.34 + 500/1.5 = 2199 \text{ (μm)} \quad \text{Expression (49):}$$

Then, an equivalent air length t1 as described above is calculated as the following expression:

$$t1 = 400/1.45 + 350/1.6 = 495 \text{ (μm)} \quad \text{Expression (50):}$$

Further, an equivalent air length t2 of the thickness between the top of the microlens 51 and the aperture position of the aperture 30 on the side of the microlens 51 is calculated as the following expression:

$$t2 = 400/1.45 = 276 \text{ (μm)} \quad \text{Expression (51):}$$

The aperture position of the aperture 30 on the side of the microlens 51 corresponds to the upper end surface of the portion 20c of the light shielding layer 20 in this embodiment.

Furthermore, an equivalent air length t3 as described above is calculated as the following expression:

$$t3 = 5/1 + 1/1.5 = 6 \text{ (μm).} \quad \text{Expression (52):}$$

The substitution of the calculation results of the expressions (49) and (50) into the expression (23) gives the following expression:

$$7.4 \text{ (μm)} \leq d1 \leq 31.9 \text{ (μm)} \quad \text{Expression (53):}$$

Thus, the above-described d1=23 (μm) satisfies the conditions of the expression (53).

The substitution of the calculation results of the expressions (50) and (51) into the expression (24) gives the following expression:

$$26 < d2 < 66 \text{ (μm)} \quad \text{Expression (54):}$$

Thus, the above-described d2=55 (μm) satisfies the conditions of the expression (54).

The substitution of the calculation results of the expressions (50) and (51) into the expression (25) gives the following expression:

$$29 < d2 < 66 \text{ (μm)} \quad \text{Expression (55):}$$

Thus, the above-described d2=55 (μm) satisfies the conditions of the expression (55).

The substitution of the calculation results of the expressions (50) and (51) into the expression (26) gives the following expression:

$$t3 < 126 \text{(μm)} \left( = \frac{(t1-t2)(2 \times p - d2 - cw)}{(d1+d2)} \right) \quad \text{Expression (56)}$$

Thus, the above-described t3=6 (μm) satisfies the conditions of the expression (56).

The use of the imaging unit 104 of this embodiment enables the obtainment of an image with less noise. Specifically, in the comparison between the case of using an imaging unit which has a transparent resin layer rather than the light shielding layer 20 and the case of using the imaging unit 104, an image with significantly less noise is obtained in the case of capturing an image using the imaging unit 104.

The above description explains some embodiments of the present invention by way of illustration only, and the present invention is not restricted to the above-mentioned embodiments. Those who skilled in the art may easily change, add and modify the elements in the above embodiments without departing from the scope of the invention. For example, a light shielding layer may be made of a metal film instead of a resin material. In such a case, the aperture opening OP1 which is located immediately above the photoreceptor 11 may be formed by creating a pinhole in the metal film. Further, a manufacturing method of an imaging unit is not limited to the above-described method.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An imaging device comprising:
a photoreceptor portion including a plurality of photoreceptors arranged in an array;
microlenses arranged corresponding to the plurality of photoreceptors; and
a light shielding layer placed between the photoreceptor portion and the microlenses and having apertures located corresponding to the plurality of photoreceptors, wherein
a relationship of an actual length d1 of an aperture width of the apertures on a side of the photoreceptors, an actual length p of a distance between adjacent microlenses, an equivalent air length t0 of a distance between an object and a top of the microlenses, and an equivalent air length t1 of a thickness between the top of the microlenses and an aperture position of the apertures on the side of the photoreceptors satisfies:

$$\frac{1.36 \times t1}{p} \leq d1 \leq \frac{2.4 \times t1}{p} + \frac{p \times t1}{t0}.$$

2. The imaging device according to claim 1, wherein a relationship of the values d1, p, t0 and t1 satisfies:

$$\frac{1.6 \times t1}{p} \le d1 \le \frac{1.9 \times t1}{p} + \frac{p \times t1}{t0}.$$

3. The imaging device according to claim 1, wherein an aperture area of the apertures on the side of the photoreceptors is equal to or smaller than an aperture area of the apertures on a side of the microlenses.

4. The imaging device according to claim 1, wherein at least a part of the light shielding layer at a boundary with the apertures is made of a light absorbing material, and at least a part of either one of a surface facing the photoreceptors or a surface facing the microlenses of the light shielding layer excluding the apertures is made of a light absorbing material or a light reflecting material.

5. The imaging device according to claim 1, wherein a relationship of an actual length d2 of an aperture width of the apertures on a side of the microlenses, an equivalent air length t2 of a thickness between a top of the microlenses and an aperture position of the apertures on the side of the microlenses, and the values t0, t1, and p satisfies:

$$d2 \ge p\left(1 - \frac{t2}{t1} + \frac{t2}{t0}\right).$$

6. The imaging device according to claim 1, wherein a relationship of the values t1, t2, d1, d2 and p satisfies:

$$t2 \le t1 \times \left(1 - \frac{(d1+d2)}{(2 \times p + d1)}\right).$$

7. The imaging device according to claim 1, wherein a relationship of an equivalent air length t3 of a thickness between the photoreceptors and an aperture position of the apertures on the side of the photoreceptors and the value t1 satisfies:

$$t3 < \frac{t1}{3}.$$

8. The imaging device according to claim 1, wherein a material being transparent to at least one wavelength in a wavelength range receivable by the photoreceptors is filled inside the apertures.

9. The imaging device according to claim 1, further comprising:
an optical filter blocking a visible light ray from entering the photoreceptors.

10. A biometric authentication apparatus comprising:
a light source outputting light to a biological portion;
an imaging unit taking an image of the biological portion exposed to light from the light source;
a storage unit storing a plurality of pieces of biometric information;
a collating unit collating biometric information obtained from the biological portion imaged by the imaging unit with biometric information stored in the storage unit; and
a control unit performing biometric authentication based on a collation result of the collating unit, wherein
the imaging unit includes:
a photoreceptor portion including a plurality of photoreceptors arranged in an array;
microlenses arranged corresponding to the plurality of photoreceptors; and
a light shielding layer placed between the photoreceptor portion and the microlenses and having apertures located corresponding to the plurality of photoreceptors, in which
a relationship of an actual length d1 of an aperture width of the apertures on a side of the photoreceptors, an actual length p of a distance between adjacent microlenses, an equivalent air length t0 of a distance between the biological portion and a top of the microlenses, and an equivalent air length t1 of a thickness between the top of the microlenses and an aperture position of the apertures on the side of the photoreceptors satisfies:

$$\frac{1.36 \times t1}{p} \le d1 \le \frac{2.4 \times t1}{p} + \frac{p \times t1}{t0}.$$

11. An imaging device comprising:
a photoreceptor portion including a plurality of photoreceptors arranged in an array;
microlenses arranged corresponding to the plurality of photoreceptors; and
a light shielding layer placed between the photoreceptor portion and the microlenses and having apertures located corresponding to the plurality of photoreceptors, wherein
a relationship of an actual length d1 of a minimum aperture width of the apertures on a side of the photoreceptors, an actual length p of a minimum distance between adjacent microlenses, an actual length wmin of a minimum width of an aperture shape of the microlenses, an equivalent air length t0 of a distance between an object and a top of the microlenses, and an equivalent air length t1 of a thickness between the top of the microlenses and an aperture position of the apertures on the side of the photoreceptors satisfies:

$$\frac{1.2 \times t1}{w\min} \le d1 \le \frac{2.4 \times t1}{w\min} + \frac{p \times t1}{t0}.$$

12. The imaging device according to claim 11, wherein a relationship of the values d1, p, wmin, t0 and t1 satisfies:

$$\frac{1.5 \times t1}{w\min} \le d1 \le \frac{1.9 \times t1}{w\min} + \frac{p \times t1}{t0}.$$

13. The imaging device according to claim 11, wherein an aperture area of the apertures on a side of the photoreceptors is equal to or smaller than an aperture area of the apertures on a side of the microlenses.

14. The imaging device according to claim 11, wherein at least a part of the light shielding layer at a boundary with the apertures is made of a light absorbing material, and at least a part of either one of a surface facing the photoreceptors or a surface facing the microlenses of the light shielding layer excluding the apertures is made of a light absorbing material or a light reflecting material.

15. The imaging device according to claim 11, wherein a relationship of an actual length d2 of a minimum aperture width of the apertures on a side of the microlenses, an equivalent air length t2 of a thickness between a top of the microlenses and an aperture position of the apertures on the side of the microlenses, and the values t1, wmin and d1 satisfies:

$$w\min - \frac{d1}{2} - \frac{t2}{t1}\left(\frac{d1}{2} + w\min\right) \le d2 \le 1.5 \times w\min\left(1 - \frac{t2}{t1}\right).$$

16. The imaging device according to claim 11, wherein a relationship of the values t1, t2, d2 and wmin satisfies:

$$\frac{2}{3} \times w\min\left(1 - \frac{t2}{t1}\right) \le d2 \le 1.5 \times w\min\left(1 - \frac{t2}{t1}\right).$$

17. The imaging device according to claim 11, wherein a relationship of an equivalent air length t3 of a thickness between the photoreceptors and an aperture position of the apertures on the side of the photoreceptors, and the values t1, t2, d1 and d2, a minimum width cw of the photoreceptors, and the value p satisfies:

$$t3 < \frac{(t1 - t2)(2 \times p - d2 - cw)}{(d1 + d2)}.$$

18. The imaging device according to claim 11, wherein a material being transparent to at least one wavelength in a wavelength range receivable in the photoreceptors is filled inside the apertures.

19. The imaging device according to claim 11, wherein a plane shape of the apertures on the side of the photoreceptors and a plane shape of the apertures on a side of the microlenses are similar or substantially similar to an aperture shape of the microlenses.

20. The imaging device according to claim 11, further comprising:
an optical filter blocking a visible light ray from entering the photoreceptors.

21. A biometric authentication apparatus comprising:
a light source outputting light to a biological portion;
an imaging unit taking an image of the biological portion exposed to light from the light source;
a storage unit storing a plurality of pieces of biometric information;
a collating unit collating biometric information obtained from the biological portion imaged by the imaging unit with biometric information stored in the storage unit; and
a control unit performing biometric authentication based on a collation result of the collating unit, wherein
the imaging unit includes:
a photoreceptor portion including a plurality of photoreceptors arranged in an array;
microlenses arranged corresponding to the plurality of photoreceptors; and
a light shielding layer placed between the photoreceptor portion and the microlenses and having apertures located corresponding to the plurality of photoreceptors, in which
a relationship of an actual length d1 of a minimum aperture width of the apertures on a side of the photoreceptors, an actual length p of a minimum distance between adjacent microlenses, an actual length wmin of a minimum width of an aperture shape of the microlenses, an equivalent air length t0 of a distance between the biological portion and a top of the microlenses, and an equivalent air length t1 of a thickness between the top of the microlenses and an aperture position of the apertures on the side of the photoreceptors satisfies:

$$\frac{1.2 \times t1}{w\min} \le d1 \le \frac{2.4 \times t1}{w\min} + \frac{p \times t1}{t0}.$$

22. The biometric authentication apparatus according to claim 21, wherein a relationship of an actual length d2 of a minimum aperture width of the apertures on a side of the microlenses, an equivalent air length t2 of a thickness between a top of the microlenses and an aperture position of the apertures on the side of the microlenses, and the values t1, wmin and d1 satisfies:

$$w\min - \frac{d1}{2} - \frac{t2}{t1}\left(\frac{d1}{2} + w\min\right) \le d2 \le 1.5 \times w\min\left(1 - \frac{t2}{t1}\right).$$

23. The biometric authentication apparatus according to claim 21, wherein a relationship of the values t1, t2, d2 and wmin satisfies:

$$\frac{2}{3} \times w\min\left(1 - \frac{t2}{t1}\right) \le d2 \le 1.5 \times w\min\left(1 - \frac{t2}{t1}\right).$$

* * * * *